(12) United States Patent
Sakhnini et al.

(10) Patent No.: US 11,817,931 B2
(45) Date of Patent: Nov. 14, 2023

(54) STICKY UL BEAM ASSIGNMENT

(71) Applicant: QUALCOMM Incorporated, San Diego, CA (US)

(72) Inventors: Iyab Issam Sakhnini, San Diego, CA (US); Tao Luo, San Diego, CA (US); Peter Gaal, San Diego, CA (US); Wanshi Chen, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/351,153

(22) Filed: Jun. 17, 2021

(65) Prior Publication Data

US 2021/0399785 A1 Dec. 23, 2021

Related U.S. Application Data

(60) Provisional application No. 63/042,425, filed on Jun. 22, 2020.

(51) Int. Cl.
*H04B 7/06* (2006.01)
*H04W 72/02* (2009.01)
(Continued)

(52) U.S. Cl.
CPC ......... *H04B 7/0695* (2013.01); *H04L 5/0051* (2013.01); *H04L 25/0226* (2013.01);
(Continued)

(58) Field of Classification Search
CPC ........ H04B 7/0695; H04B 7/08; H04B 7/088; H04L 5/0051; H04L 25/0226;
(Continued)

(56) References Cited

U.S. PATENT DOCUMENTS

2016/0294462 A1* 10/2016 Jeong .................. H04B 7/063
2018/0234959 A1* 8/2018 Ahn .................... H04W 72/046
(Continued)

FOREIGN PATENT DOCUMENTS

EP     3855824 A1   7/2021
WO  2020056697 A1   3/2020

OTHER PUBLICATIONS

Ericsson: "New SID on Support of Reduced Capability NR Devices", 3GPP TSG RAN Meeting #86, 3GPP Draft, RP-193238, 3rd Generation Partnership Project (3GPP), Mobile Competence Centre, 650, Route Des Lucioles, F-06921 Sophia-Antipolis Cedex, France, vol. TSG RAN, No. Sitges, Spain, Dec. 9, 2019-Dec. 12, 2019, Dec. 12, 2019 (Dec. 12, 2019), 5 Pages, XP051840369, Retrieved from the Internet: URL: https://ftp.3gpp.org/tsg_ran/TSG_RAN/TSGR_86/Docs/RP-193238.zip RP-193238 New SID on support of reduced capability NR devices.doc [retrieved on Dec. 12, 2019] the whole document.

(Continued)

*Primary Examiner* — Thai Nguyen
(74) *Attorney, Agent, or Firm* — Loza & Loza LLP/ QUALCOMM Incorporated

(57) ABSTRACT

Aspects of the disclosure relate to a base station providing a user equipment (UE) with a sticky uplink beam assignment for one or more uplink signals. The UE may use the sticky uplink beam assignment for transmission of uplink signals until a new sticky uplink beam assignment is received. In some examples, the sticky uplink beam assignment may include an uplink beam identifier (ID) identifying an uplink beam associated with the transmission of an uplink signal. The uplink beam identified by the uplink beam ID may be used by the UE for transmission of the uplink signal and either all subsequent uplink signals (e.g., physical uplink control channel (PUCCH) and/or physical uplink shared channel (PUSCH)) or subsequent uplink signals of particular (Continued)

uplink channel types (e.g., dynamic PUSCH, configured grant (CG), PUCCH, etc.) until a new uplink beam ID is received. Other aspects, features, and examples are also claimed and described.

38 Claims, 14 Drawing Sheets

(51) Int. Cl.
  *H04W 72/1268* (2023.01)
  *H04L 5/00* (2006.01)
  *H04L 25/02* (2006.01)
  *H04W 72/044* (2023.01)
  *H04W 72/23* (2023.01)

(52) U.S. Cl.
  CPC ......... *H04W 72/02* (2013.01); *H04W 72/046* (2013.01); *H04W 72/1268* (2013.01); *H04W 72/23* (2023.01)

(58) Field of Classification Search
  CPC .... H04L 5/0025; H04L 5/0094; H04W 72/02; H04W 72/046; H04W 72/1268; H04W 72/14; H04W 72/0413
  See application file for complete search history.

(56) References Cited

U.S. PATENT DOCUMENTS

| 2018/0324678 | A1 | 11/2018 | Chen et al. |
| 2019/0261338 | A1 | 8/2019 | Akkarakaran et al. |
| 2020/0245200 | A1* | 7/2020 | Xiong ................. H04B 7/0626 |
| 2021/0226689 | A1* | 7/2021 | Farag ................. H04B 7/0695 |

OTHER PUBLICATIONS

International Search Report and Written Opinion—PCT/US2021/038061—ISA/EPO—dated Sep. 24, 2021.

* cited by examiner

STICKY UL BEAM ASSIGNMENT

CROSS-REFERENCE TO RELATED APPLICATIONS

The present Application for Patent claims priority to and the benefit of U.S. Provisional Application No. 63/042,425, filed Jun. 22, 2020, and assigned to the assignee hereof and hereby expressly incorporated by reference herein as if fully set forth below in its entirety and for all applicable purposes.

INTRODUCTION

The technology discussed below relates generally to wireless communication networks, and more particularly, to uplink beam assignment in beam-based communication scenarios (e.g., millimeter wave beams).

In wireless communication systems, such as those specified under standards for 5G New Radio (NR), a base station and user equipment (UE) may utilize beamforming to compensate for high path loss and short range. Beamforming is a signal processing technique used with an antenna array for directional signal transmission and/or reception. Each antenna in the antenna array transmits a signal that is combined with other signals of other antennas of the same array in such a way that signals at particular angles experience constructive interference while others experience destructive interference.

The base station and the UE can select one or more beam pair links (BPLs) for communication therebetween on the downlink and/or the uplink. Each BPL includes corresponding transmit and receive beams on the base station and UE. For example, on the uplink, a BPL includes a transmit beam on the UE and a receive beam on the base station. Uplink transmit beams on the UE may vary depending on the uplink signal being transmitted from the UE to the base station. For example, different uplink transmit beams may be used for the transmission of uplink data and uplink control information. In some wireless network configurations, the particular uplink transmit beam to use for transmission of an uplink signal may be dynamically assigned by the base station.

BRIEF SUMMARY

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a user equipment (UE) configured for wireless communication in a wireless communication network is disclosed. The UE includes a processor and a memory coupled to the processor. The processor and the memory can be configured to receive a first beam identifier (ID) from a base station. The first beam ID identifying a first uplink beam of a plurality of uplink beams associated with transmission of a first uplink signal. The processor and the memory can further be configured to transmit the first uplink signal to the base station on the first uplink beam and transmit at least one subsequent uplink signal to the base station utilizing the first uplink beam.

Another example provides a method for wireless communication at a user equipment (UE) in a wireless communication network. The method includes receiving a first beam identifier (ID) from a base station. The first beam ID identifying a first uplink beam of a plurality of uplink beams associated with transmission of a first uplink signal. The method further includes transmitting the first uplink signal to the base station on the first uplink beam and transmitting at least one subsequent uplink signal to the base station utilizing the first uplink beam.

Another example provides a UE in a wireless communication network. The UE can include means for receiving a first beam identifier (ID) from a base station. The first beam ID identifying a first uplink beam of a plurality of uplink beams associated with transmission of a first uplink signal. The UE can further include means for transmitting the first uplink signal to the base station on the first uplink beam and means for transmitting at least one subsequent uplink signal to the base station utilizing the first uplink beam.

Another example provides a non-transitory computer-readable medium having stored therein instructions executable by one or more processors of a UE to receive a first beam identifier (ID) from a base station. The first beam ID identifying a first uplink beam of a plurality of uplink beams associated with transmission of a first uplink signal. The non-transitory computer-readable medium can further include instructions executable by the one or more processors of the UE to transmit the first uplink signal to the base station on the first uplink beam and transmit at least one subsequent uplink signal to the base station utilizing the first uplink beam.

In another example, a base station configured for wireless communication in a wireless communication network is disclosed. The base station includes a processor and a memory coupled to the processor. The processor and the memory can be configured to transmit to a user equipment (UE) in wireless communication with the base station a first beam identifier (ID) identifying a first uplink beam of a plurality of uplink beams associated with transmission of a first uplink signal by the UE, and receive the first uplink signal and at least one subsequent uplink signal from the UE on the first uplink beam.

Another example provides a method for wireless communication at a base station in a wireless communication network. The method includes transmitting to a user equipment (UE) in wireless communication with the base station a first beam identifier (ID) identifying a first uplink beam of a plurality of uplink beams associated with transmission of a first uplink signal by the UE, and receiving the first uplink signal and at least one subsequent uplink signal from the UE on the first uplink beam.

Another example provides a base station in a wireless communication network. The base station can include means for transmitting to a user equipment (UE) in wireless communication with the base station a first beam identifier (ID) identifying a first uplink beam of a plurality of uplink beams associated with transmission of a first uplink signal by the UE, and means for receiving the first uplink signal and at least one subsequent uplink signal from the UE on the first uplink beam.

Another example provides a non-transitory computer-readable medium having stored therein instructions executable by one or more processors of a base station to transmit to a user equipment (UE) in wireless communication with the base station a first beam identifier (ID) identifying a first uplink beam of a plurality of uplink beams associated with transmission of a first uplink signal by the UE, and receive the first uplink signal and at least one subsequent uplink signal from the UE on the first uplink beam.

In another example, a method for wireless communication at a user equipment (UE) in a wireless communication network is disclosed. The method includes receiving a first beam identifier (ID) from a base station. The first beam ID identifying a first uplink beam of a plurality of uplink beams associated with transmission of a first uplink signal. The method further includes transmitting the first uplink signal to the base station on the first uplink beam, and utilizing the first uplink beam for transmission of at least one subsequent uplink signal to the base station until a new beam ID is received from the base station. The new beam ID is different from the first beam ID.

Another example provides a UE in a wireless communication network including a memory and a processor coupled to the memory. The processor and the memory can be configured to receive a first beam identifier (ID) from a base station. The first beam ID identifying a first uplink beam of a plurality of uplink beams associated with transmission of a first uplink signal. The processor and the memory can further be configured to transmit the first uplink signal to the base station on the first uplink beam, and utilize the first uplink beam for transmission of at least one subsequent uplink signal to the base station until a new beam ID is received from the base station. The new beam ID is different from the first beam ID.

Another example provides a UE in a wireless communication network. The UE can include means for receiving a first beam identifier (ID) from a base station. The first beam ID identifying a first uplink beam of a plurality of uplink beams associated with transmission of a first uplink signal. The UE can further include means for transmitting the first uplink signal to the base station on the first uplink beam, and means for utilizing the first uplink beam for transmission of at least one subsequent uplink signal to the base station until a new beam ID is received from the base station. The new beam ID is different from the first beam ID.

Another example provides a non-transitory computer-readable medium including code for causing a UE to receive a first beam identifier (ID) from a base station. The first beam ID identifying a first uplink beam of a plurality of uplink beams associated with transmission of a first uplink signal. The non-transitory computer-readable medium can further include code for causing the UE to transmit the first uplink signal to the base station on the first uplink beam, and utilize the first uplink beam for transmission of at least one subsequent uplink signal to the base station until a new beam ID is received from the base station. The new beam ID is different from the first beam ID.

In another example, a method for wireless communication at a base station in a wireless communication network is disclosed. The method includes selecting a first beam identifier (ID) identifying a first uplink beam of a plurality of uplink beams associated with transmission of a first uplink signal by a user equipment (UE) in wireless communication with the base station, transmitting the first beam ID associated with the first uplink signal to the UE, and receiving the first uplink signal and at least one subsequent uplink signal from the UE on the first uplink beam. The method further includes selecting a new beam ID identifying a new uplink beam of the plurality of uplink beams associated with transmission of a new uplink signal after the at least one subsequent signal by the UE, where the new beam ID is different from the first beam ID, and transmitting the new beam ID associated with the new uplink signal to the UE.

Another example provides a base station in a wireless communication network including a memory and a processor coupled to the memory. The processor and the memory can be configured to select a first beam identifier (ID) identifying a first uplink beam of a plurality of uplink beams associated with transmission of a first uplink signal by a user equipment (UE) in wireless communication with the base station, transmit the first beam ID associated with the first uplink signal to the UE, and receive the first uplink signal and at least one subsequent uplink signal from the UE on the first uplink beam. The processor and the memory can further be configured to select a new beam ID identifying a new uplink beam of the plurality of uplink beams associated with transmission of a new uplink signal after the at least one subsequent signal by the UE, where the new beam ID is different from the first beam ID, and transmit the new beam ID associated with the new uplink signal to the UE.

Another example provides a base station in a wireless communication network. The base station can include means for selecting a first beam identifier (ID) identifying a first uplink beam of a plurality of uplink beams associated with transmission of a first uplink signal by a user equipment (UE) in wireless communication with the base station, means for transmitting the first beam ID associated with the first uplink signal to the UE, and means for receiving the first uplink signal and at least one subsequent uplink signal from the UE on the first uplink beam. The base station can further include means for selecting a new beam ID identifying a new uplink beam of the plurality of uplink beams associated with transmission of a new uplink signal after the at least one subsequent signal by the UE, where the new beam ID is different from the first beam ID, and means for transmitting the new beam ID associated with the new uplink signal to the UE.

Another example provides a non-transitory computer-readable medium including code for causing a base station to select a first beam identifier (ID) identifying a first uplink beam of a plurality of uplink beams associated with transmission of a first uplink signal by a user equipment (UE) in wireless communication with the base station, transmit the first beam ID associated with the first uplink signal to the UE, and receive the first uplink signal and at least one subsequent uplink signal from the UE on the first uplink beam. The non-transitory computer-readable medium can further include code for causing the base station to select a new beam ID identifying a new uplink beam of the plurality of uplink beams associated with transmission of a new uplink signal after the at least one subsequent signal by the UE, where the new beam ID is different from the first beam ID, and transmit the new beam ID associated with the new uplink signal to the UE.

These and other aspects will become more fully understood upon a review of the detailed description, which follows. Other aspects, features, and examples will become apparent to those of ordinary skill in the art, upon reviewing the following description of specific, exemplary aspects of in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects, such exemplary aspects can be implemented in various devices, systems, and methods.

DETAILED DESCRIPTION

Figure 1:
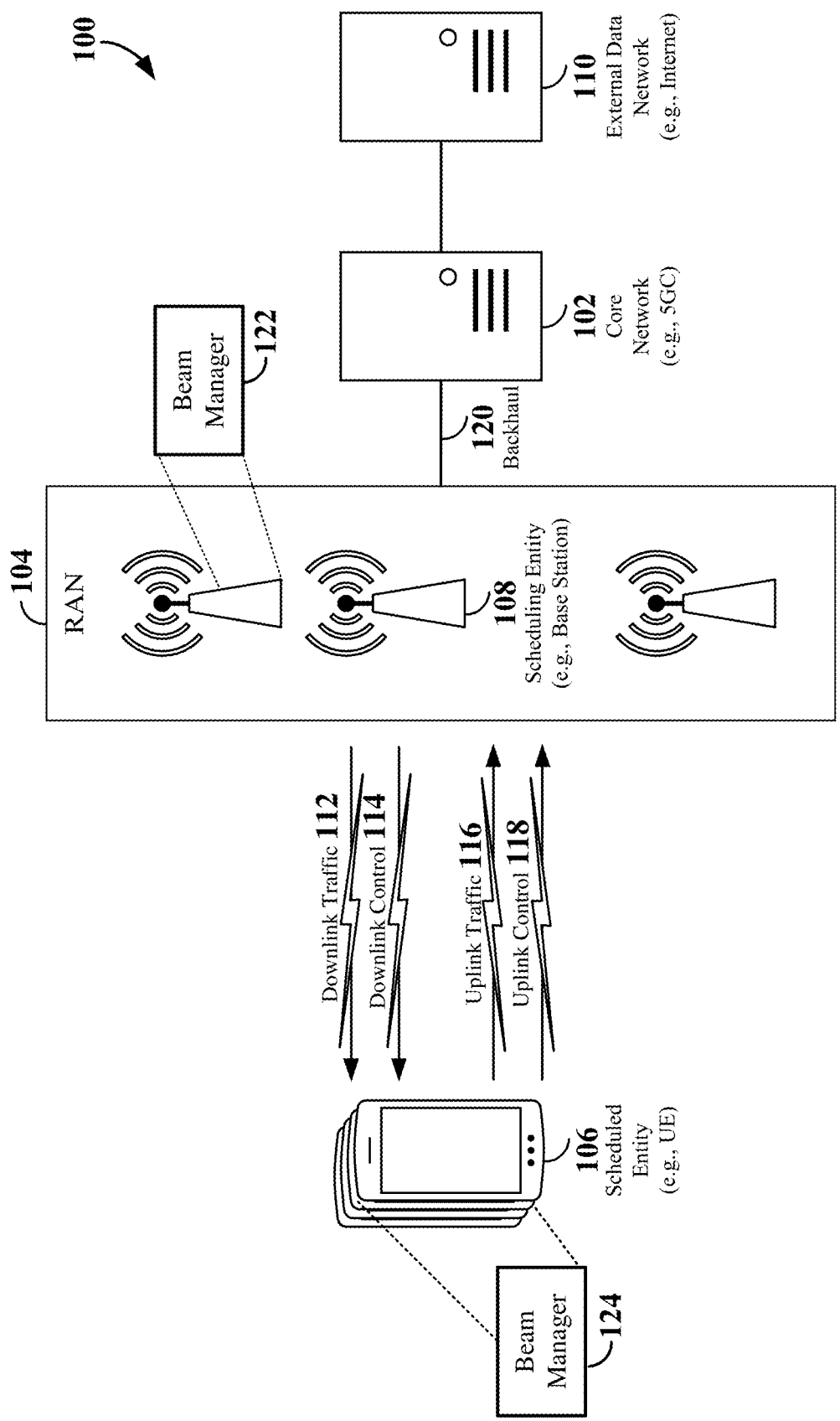
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

While aspects and features are described in this application by illustration to some examples, those skilled in the art will understand that additional implementations and use cases may come about in many different arrangements and scenarios. Examples described herein may be implemented across many differing platform types, devices, systems, shapes, sizes, and packaging arrangements. For example, aspects and/or uses may come about via integrated chip devices and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described examples may occur. Implementations may range in spectrum from chip-level or modular components to non-modular, non-chip-level implementations and further to aggregate, distributed, or OEM devices or systems incorporating one or more aspects of the described examples. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that examples described herein may be practiced in a wide variety of devices, chip-level components, systems, distributed arrangements, end-user devices, etc. of varying sizes, shapes and constitution.

Fifth generation (5G) wireless communication networks, such as the New Radio (NR) wireless communication network, support communication between a base station and high-end UEs for a plurality of different usage cases, including, for example, enhanced mobile broadband (eMBB) and ultra-reliable and low latency communication (URLLC). NR networks may further support communication between a base station and low-end UEs in massive machine-type communication (mMTC) usage cases. In some examples, LTE-M or Narrowband Internet of Things (NB-IoT) technology may be utilized to meet the requirements of mMTC.

In addition to providing services to high-end UEs (e.g., via eMMB and/or URLLC) and low-end UEs (e.g., via mMTC), NR networks may further provide services to reduced capability UEs. The service requirements for reduced capability UEs may be less than high-end UEs, but greater than low-end UEs. For example, use cases for reduced capability UEs may include not only URLLC services with high requirements, but also low-end services to accommodate smaller form factors and longer battery lives. Examples of reduced-capability UEs may include, but are not limited to, industrial wireless sensors, surveillance cameras, and wearable devices (e.g., smart watches, rings, eHealth related devices, and medical monitoring devices). In general, reduced capability UEs have a device design with a compact form factor and reduced complexity as compared to high-end UEs. For example, reduced capability UEs may have a reduced number of transmit/receive antennas, reduced device bandwidth (e.g., reduced operating bandwidth of the UE), relaxed processing time, and/or relaxed processing capability. Reduced capability UEs may further be configured for power saving and battery lifetime enhancement in delay tolerant use cases.

The distribution of stationary reduced capability UEs (e.g., industrial wireless sensors, video surveillance cameras, etc.) within the coverage area of a base station may result in overloading of beams and/or persistent interference within a beam or across beams. For efficient beam utilization and interference management, the base station may be configured to control the distribution of UEs among the different beams by dynamic beam assignment (e.g., by transmission of a dynamically assigned beam identifier (ID)). In some examples, for uplink beam assignment, the beam ID may correspond to a sounding reference signal (SRS) resource identifier (SRI) included in downlink control information (DCI) scheduling a physical uplink shared channel (PUSCH). In other examples, the beam ID for uplink beam assignment may correspond to an uplink spatial relation activation for a physical uplink control channel (PUCCH) resource (e.g., a set of one or more REs allocated for transmission of a PUCCH) included in a medium access control (MAC) control element (MAC-CE). The uplink spatial relation may indicate, for example, a spatial property of a selected uplink transmit beam (e.g., a beam direction) by association with the spatial property of a downlink reference signal. For example, the uplink spatial relation may indicate an associated synchronization signal block (SSB), channel state information reference signal (CSI-RS), or tracking reference signal (TRS) waveform from which the spatial property of the uplink transmit beam may be inferred.

However, dynamic signaling of beam IDs to UEs may cause additional overhead. For example, when resources are scheduled using semi-persistent scheduling (SPS) on the downlink or a configured grant (CG) on the uplink, the interference from other UEs on a beam may be predictable. Moreover, in cases of persistent interference (especially on the uplink), base station beam control may not be sufficient or efficient. In addition, when event triggering is utilized for L1 measurements, the base station may not have updated or accurate beam information for each of the UEs, and as such, dynamic beam assignment may not be efficient. Therefore, in each of these cases, using dynamic signaling for beam assignment may result in unnecessary overhead.

Dynamic beam assignment may further suffer from internal UE delays. For example, a UE may apply a timer upon receiving a beam assignment. The timer ensures that there is sufficient time for the UE to switch from a previous beam to a new beam indicated by the beam assignment. Therefore, there is a delay between receiving the DCI indicating the SRI and application of the SRI for a PUSCH transmission. In addition, there is a delay between receiving the MAC-CE activating the uplink spatial relation and spatial relation application for a PUCCH transmission. These delays may result in additional scheduling constraints of PUCCH and PUSCH transmissions.

Various aspects of the disclosure relate to a base station providing a user equipment (UE) with a sticky uplink beam assignment for one or more uplink signals. As used herein, the term sticky may refer to a semi-static configuration of the uplink beam assignment in which the UE applies the uplink beam assignment to uplink signals transmitted by the UE until a new sticky uplink beam assignment is received from the base station. In some examples, the sticky uplink beam assignment may include an uplink beam identifier (ID) identifying an uplink beam associated with the transmission of an uplink signal. In an example, the uplink beam identified by the uplink beam ID may be used by the UE for transmission of the uplink signal and all subsequent uplink signals (e.g., physical uplink control channel (PUCCH) and/or physical uplink shared channel (PUSCH)). In another example, the uplink beam identified by the uplink beam ID may be used by the UE for transmission of the uplink signal and all subsequent uplink signals of particular uplink channel types (e.g., dynamic PUSCH, configured grant (CG), PUCCH, etc.). In addition, different sticky uplink beam assignments may be configured for different channel types and/or different grants of a particular channel type. For example, different sticky uplink beam assignments may be used for different CGs and/or different PUCCH resources (e.g., a set of time-frequency resources allocated for transmission of a PUCCH). By utilizing a sticky uplink beam assignment for uplink signal transmission, the internal UE timer delays and corresponding scheduling constraints at the base station may be eliminated. In addition, the overhead may be reduced by avoiding dynamic uplink beam assignments.

In some examples, the uplink beam ID for the sticky uplink beam assignment may correspond to a sounding reference signal (SRS) resource identifier (SRI) included in downlink control information (DCI) scheduling a physical uplink shared channel (PUSCH). The SRI identifies the uplink beam to utilize for transmission of the PUSCH. In other examples, the uplink beam ID for the sticky uplink beam assignment may correspond to an uplink spatial relation activation for a physical uplink control channel (PUCCH) resource included in a medium access control (MAC) control element (MAC-CE).

In some examples, the base station may transmit control information (e.g., DCI) scheduling transmission of a subsequent uplink signal. The DCI may indicate to use the uplink beam corresponding to the sticky uplink beam assignment. For example, the DCI may include an SRI codepoint indicating to use the last uplink beam previously utilized by the UE for transmission to the base station. As another example, the DCI may include an SRI codepoint of the sticky uplink beam. As yet another example, the DCI may exclude the SRI codepoint, and therefore, may have a reduced size.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, the base station 108 and UE 106 may be configured for beamforming to transmit one or more beamformed signals within, for example, a mmWave frequency band. For example, the UE 106 may be configured to transmit one or more uplink signals on one or more uplink beams to the base station, and vice-versa. To facilitate transmission of uplink signals using uplink beams, the base station 108 may include a beam manager 122 configured to provide a sticky uplink beam assignment for one or more uplink signals. In addition, the UE 106 may further include a beam manager 124 configured to use the sticky uplink beam assignment for transmission of uplink signals to the base station until a new sticky uplink beam assignment is received. In some examples, the sticky uplink beam assignment may include an uplink beam identifier (ID) identifying an uplink beam associated with the transmission of an uplink signal. The uplink beam identified by the uplink beam ID may be used by the UE for transmission of the uplink signal and either all subsequent uplink signals or subsequent uplink signals of particular uplink channel types.

In some examples, access to the air interface may be scheduled, wherein a scheduling entity (e.g., a base station 108) allocates resources for communication among some or all devices and equipment within its service area or cell.

Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). And as discussed more below, UEs may communicate directly with other UEs in peer-to-peer fashion and/or in relay configuration.

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
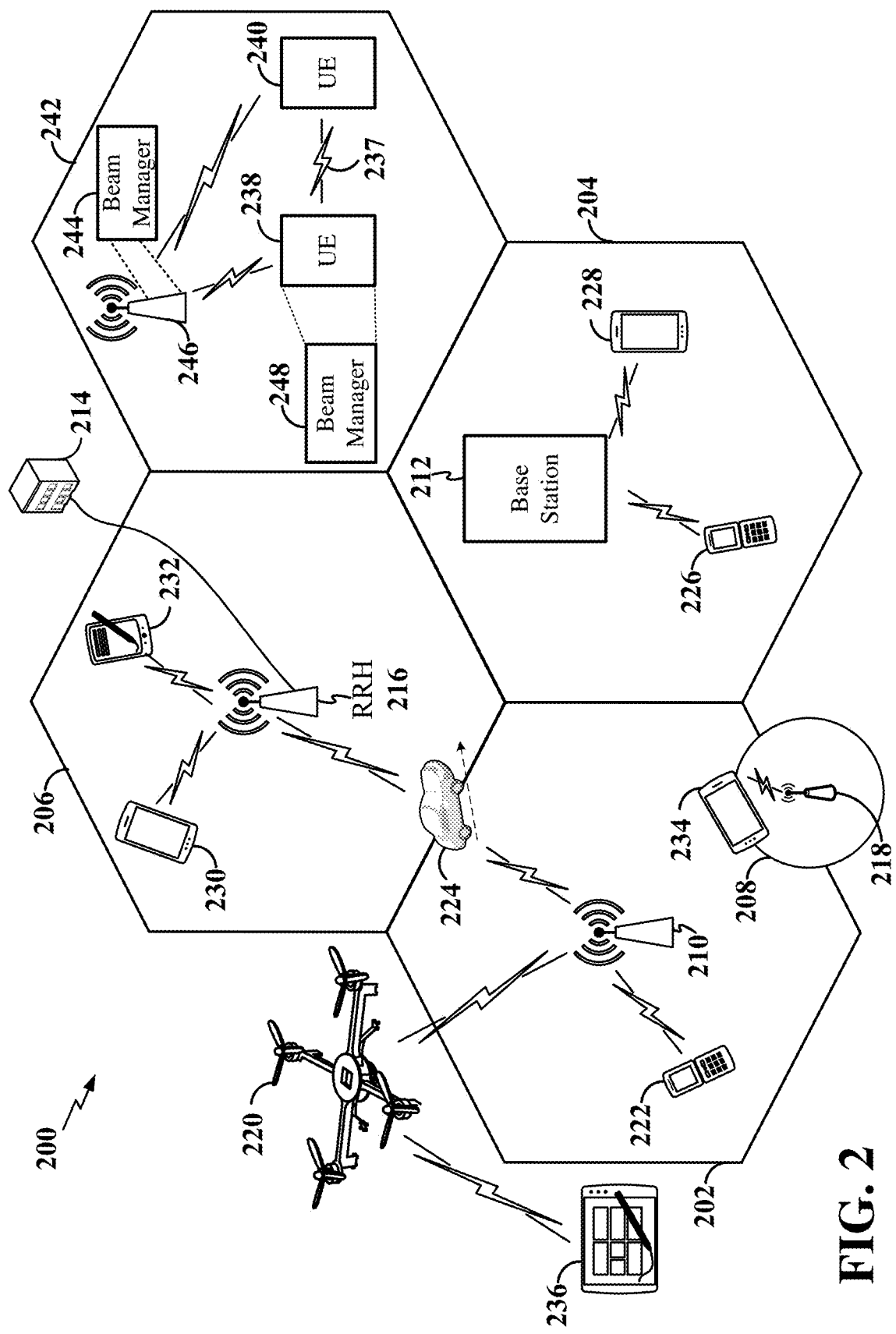
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1.

The geographic area covered by the RAN 200 may be divided into cellular regions (cells) that can be uniquely identified by a user equipment (UE) based on an identification broadcasted from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, three base stations 210, 212, and 246 are shown in cells 202, 204, and 242; and a third base station 214 is shown controlling a remote radio head (RRH) 216 in cell 206. That is, a base station can have an integrated antenna or can be connected to an antenna or RRH by feeder cables. In the illustrated example, the cells 202, 204, 206, and 242 may be referred to as macrocells, as the base stations 210, 212, 214, and 246 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218, and 246 provide wireless access points to a core network for any number of mobile apparatuses. In some examples, the base stations 210, 212, 214, 218, and/or 246 may be the same as the base station/scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 246 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UEs 238 and 240 may be in communication with base station 246. In some examples, the UEs 222, 224, 226, 228, 230, 232, 234, 238, and/or 240 may be the same as the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In the RAN 200, the ability for a UE to communicate while moving, independent of their location, is referred to as mobility. The various physical channels between the UE and the RAN are generally set up, maintained, and released under the control of an access and mobility management function (AMF), which may include a security context management function (SCMF) that manages the security context for both the control plane and the user plane functionality and a security anchor function (SEAF) that performs authentication. In some examples, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238 and 240) may communicate with each other using peer to peer (P2P) or sidelink signals 237 without relaying that communication through a base station (e.g., base station 246). In some examples, the sidelink signals 237 include sidelink traffic and sidelink control. In some examples, the UEs 238 and 240 may each function as a scheduling entity or an initiating (e.g., transmitting) sidelink device and/or a scheduled entity or a receiving sidelink device.

In some examples, beamformed signals may be utilized between a base station (e.g., base station 246) and a UE (e.g., UE 238) communicating, for example, over a mmWave carrier. To facilitate transmission of uplink signals using uplink beams, the base station 246 may include a beam manager 244 configured to provide a sticky uplink beam assignment for one or more uplink signals. In addition, the UE 238 may further include a beam manager 248 configured to use the sticky uplink beam assignment for transmission of uplink signals to the base station until a new sticky uplink beam assignment is received. In some examples, the sticky uplink beam assignment may include an uplink beam identifier (ID) identifying an uplink beam associated with the transmission of an uplink signal. The uplink beam identified by the uplink beam ID may be used by the UE for transmission of the uplink signal and either all subsequent uplink signals or subsequent uplink signals of particular uplink channel types.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
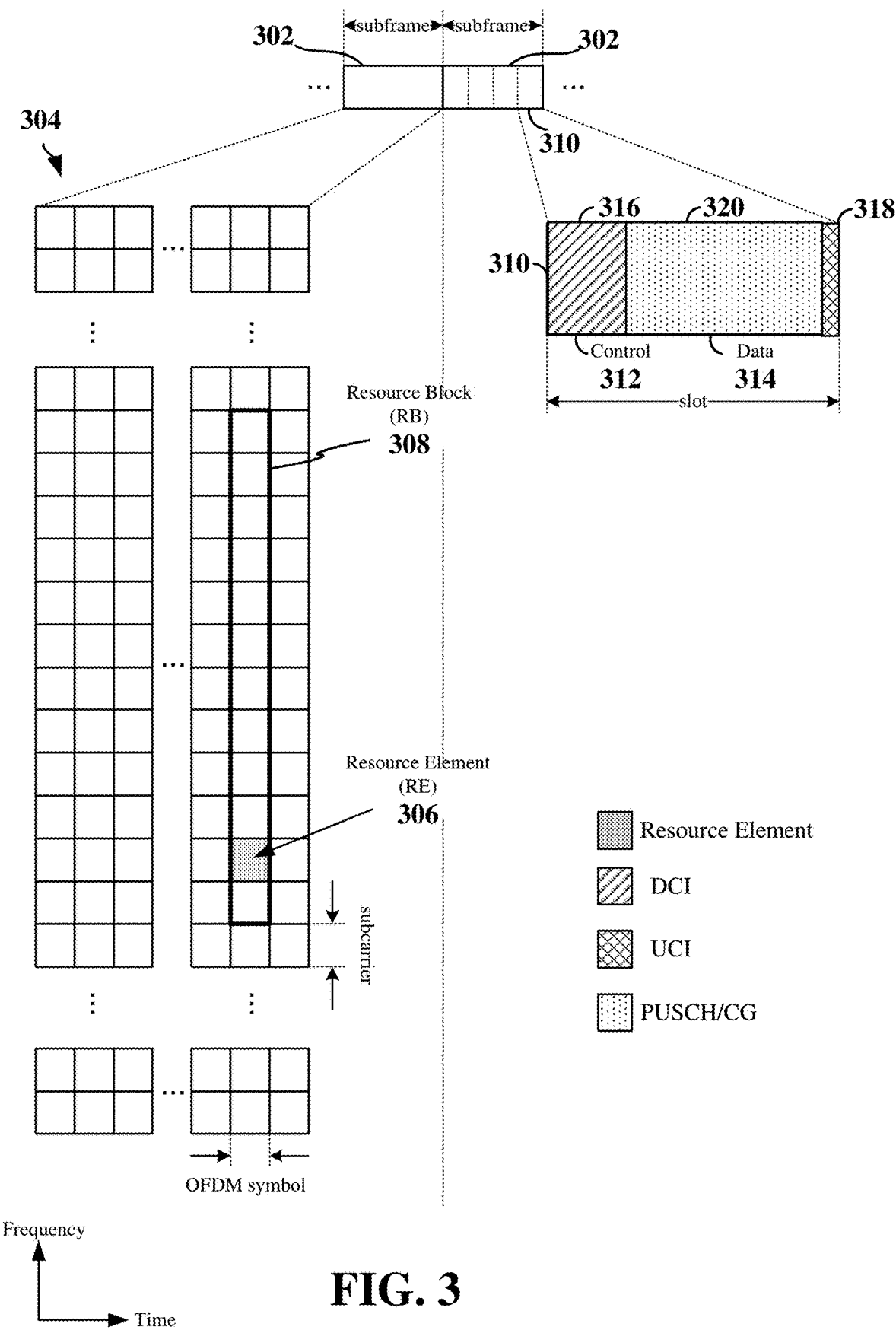
FIG. 3 is a diagram illustrating an example of a frame structure for use in a radio access network according to some aspects.

Referring now to FIG. 3, an expanded view of an exemplary DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.), or may be self-scheduled by a UE implementing D2D sidelink communication.

Scheduling of the resources (e.g., REs 306/RBs 308) to transmit control and/or traffic information may be performed in a dynamic manner or a semi-persistent manner. For example, the scheduling entity (e.g., base station) may dynamically allocate a set of REs 306/RBs 308 for the transmission of downlink control and/or data to the UE or for the transmission of uplink control and/or data from the UE. The base station may further semi-persistently allocate a set of REs 306/RBs 308 for periodic downlink or uplink transmissions. Generally, semi-persistent scheduling (SPS) may be used for periodic communications based on defined settings. For example, SPS may be suitable for applications with small, predictable, and/or periodic payloads, such as voice over Internet protocol (VoIP) applications. On the uplink, an SPS resource may be referred to as a configured grant (CG). With CGs, scheduling information corresponding to the uplink CG may be signaled just once to the UE. Subsequently, without needing to receive additional scheduling information, the UE may periodically utilize the resources allocated in the uplink CG. The periodicity with which the UE may transmit user data traffic via the semi-persistently scheduled resources may be established when the CG is initially configured.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) 316 including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) 318 including one or more UL control channels, such as a physical uplink control channel (PUCCH), to the scheduling entity. UCI 318 may include a variety of packet types and categories, including pilots, reference signals, and information configured to enable or assist in decoding uplink data transmissions. In some examples, the UCI 318 may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI 318 may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH)/configured grant (CG) 320. In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., V2X or other sidelink device) towards a set of one or more other receiving sidelink devices. The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS), may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above in connection with FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
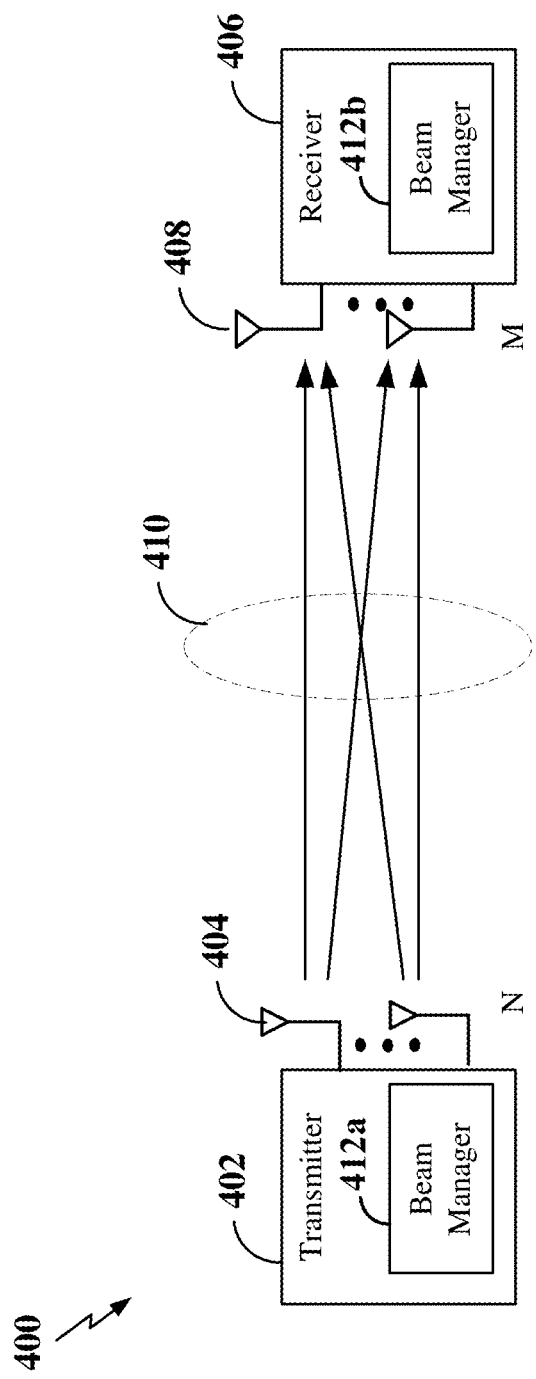
FIG. 4 is a block diagram illustrating a wireless communication system supporting beamforming and/or multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 4 illustrates an example of a wireless communication system 400 supporting beamforming and/or MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 400 is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

To facilitate transmission of uplink signals using uplink beams from, for example, a transmitter 402 to a receiver 406, each of the transmitter 402 and receiver 406 may include a respective beam manager 412a and 412b configured to utilize a sticky uplink beam assignment for one or more uplink signals until a new sticky uplink beam assignment is identified. In some examples, the sticky uplink beam assignment may include an uplink beam identifier (ID) identifying an uplink beam associated with the transmission of an uplink signal. The uplink beam identified by the uplink beam ID may be used by the transmitter 402 for transmission of the uplink signal and either all subsequent uplink signals or subsequent uplink signals of particular uplink channel types.

In 5G New Radio (NR) systems, particularly for above 6 GHz or mmWave systems, beamformed signals may be utilized for most downlink channels, including the physical downlink control channel (PDCCH) and physical downlink shared channel (PDSCH). In addition, broadcast control information, such as the SSB, slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH). However, it should be understood that beamformed signals may also be utilized by enhanced mobile broadband (eMBB) gNBs for sub-6 GHz systems.

A base station (e.g., gNB) may generally be capable of communicating with UEs using transmit beams (e.g., downlink transmit beams) of varying beam widths. For example, a base station may be configured to utilize a wider beam when communicating with a UE that is in motion and a narrower beam when communicating with a UE that is stationary. The UE may further be configured to utilize one or more downlink receive beams to receive signals from the base station. In some examples, to select one or more downlink transmit beams and one or more downlink receive beams for communication with a UE, the base station may transmit a reference signal, such as an SSB or CSI-RS, on each of a plurality of downlink transmit beams in a beam-sweeping manner. The UE may measure the reference signal received power (RSRP) on each of the downlink transmit beams using one or more downlink receive beams on the UE and transmit a Layer 1 (L1) measurement report to the base station indicating the RSRP of one or more of the measured downlink transmit beams. The base station may then select one or more serving downlink beams (e.g., downlink transmit beams and downlink receive beams) for communication with the UE based on the L1 measurement report. The resulting selected downlink transmit beam and downlink receive beam may form a downlink beam pair link. In other examples, when the channel is reciprocal, the base station may derive the particular downlink beam(s) to communicate with the UE based on uplink measurements of one or more uplink reference signals, such as sounding reference signals (SRSs).

Similarly, uplink beams (e.g., uplink transmit beam(s) at the UE and uplink receive beam(s) at the base station) may be selected by measuring the RSRP of received uplink reference signals (e.g., SRSs) or downlink reference signals (e.g., SSBs or CSI-RSs) during an uplink or downlink beam sweep. For example, the base station may determine the uplink beams either by uplink beam management via an SRS beam sweep with measurement at the base station or by downlink beam management via an SSB/CSI-RS beam sweep with measurement at the UE. The selected uplink beam may be indicated by a selected SRS resource (e.g., time-frequency resources utilized for the transmission of an SRS) when implementing uplink beam management or a selected SSB/CSI-RS resource when implementing downlink beam management. For example, the selected SSB/CSI-RS resource can have a spatial relation to the selected uplink transmit beam (e.g., the uplink transmit beam utilized for the PUCCH, SRS, and/or PUSCH). The resulting selected uplink transmit beam and uplink receive beam may form an uplink beam pair link.

Figure 5:
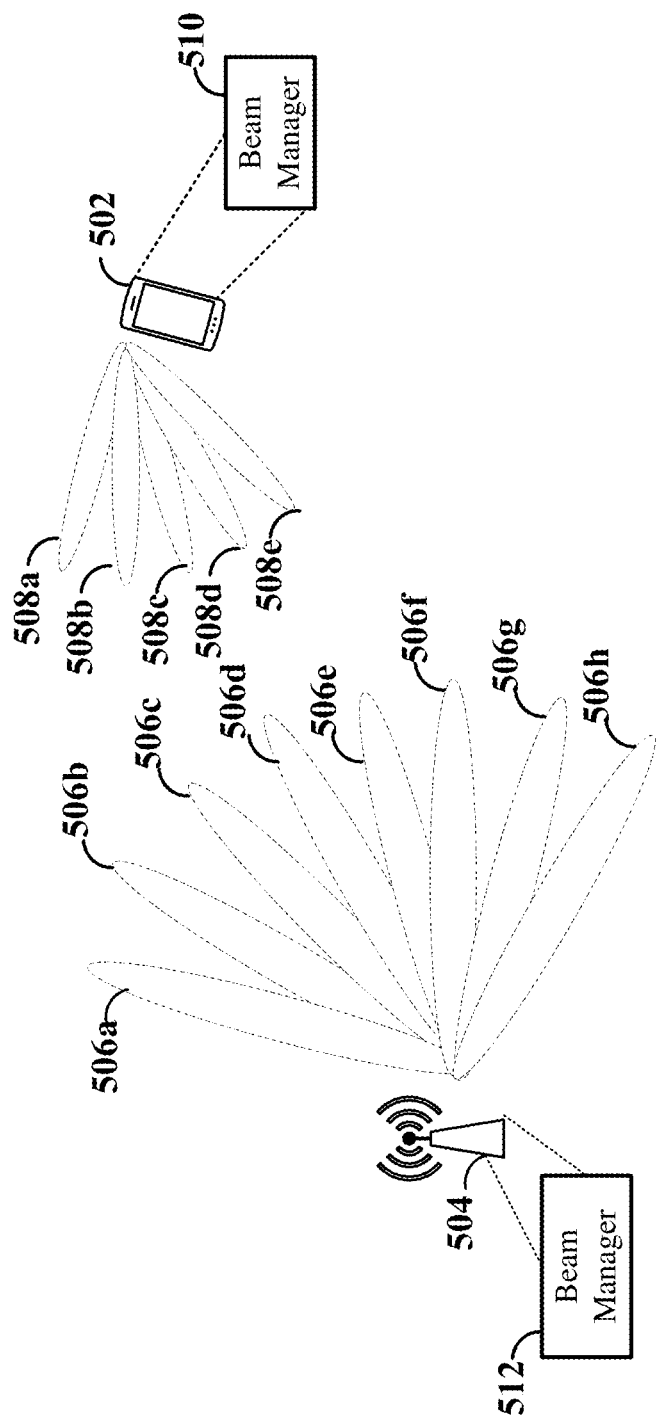
FIG. 5 is a diagram illustrating an example of communication between a base station and a UE using beamforming according to some aspects.

FIG. 5 is a diagram illustrating communication between a base station 504 and a UE 502 using beamformed signals according to some aspects. The base station 504 may be any of the base stations (e.g., gNBs) or scheduling entities illustrated in FIGS. 1 and/or 2, and the UE 502 may be any of the UEs or scheduled entities illustrated in FIGS. 1 and/or 2.

In the example shown in FIG. 5, the base station 504 is configured to generate a plurality of beams 506a-506h, each associated with a different beam direction. In addition, the UE 502 is configured to generate a plurality of beams 508a-508e, each associated with a different beam direction. The base station 504 and UE 502 may select one or more beams 506a-506h on the base station 504 and one or more beams 508a-508e on the UE 502 for communication of uplink and downlink signals therebetween using a downlink beam management scheme and/or an uplink beam management scheme.

In an example of a downlink beam management scheme for selection of downlink beams, the base station 504 may be configured to sweep or transmit on each of a plurality of downlink transmit beams 506a-506h during one or more synchronization slots. For example, the base station 504 may transmit a reference signal, such as an SSB or CSI-RS, on each beam in the different beam directions during the synchronization slot. Transmission of the beam reference signals may occur periodically (e.g., as configured via radio resource control (RRC) signaling by the gNB), semi-persistently (e.g., as configured via RRC signaling and activated/deactivated via medium access control-control element (MAC-CE) signaling by the gNB), or aperiodically (e.g., as triggered by the gNB via downlink control information (DCI)). It should be noted that while some beams are illustrated as adjacent to one another, such an arrangement may be different in different aspects. For example, downlink transmit beams 506a-506h transmitted during a same symbol may not be adjacent to one another. In some examples, the base station 504 may transmit more or less beams distributed in all directions (e.g., 360 degrees).

In addition, the UE 502 is configured to receive the downlink beam reference signals on a plurality of downlink receive beams 508a-508e. In some examples, the UE 502 searches for and identifies each of the downlink transmit beams 506a-506h based on the beam reference signals. The UE 502 then performs beam measurements (e.g., RSRP, SINR, RSRQ, etc.) on the beam reference signals on each of the downlink receive beams 508a-508e to determine the respective beam quality of each of the downlink transmit beams 506a-506h as measured on each of the downlink receive beams 508a-508e.

The UE 502 can generate and transmit an L1 measurement report, including the respective beam index (beam identifier (ID)) and beam measurement of one or more of the downlink transmit beam 506a-506h on one or more of the downlink receive beams 508a-508e to the base station 504. The base station 504 may then select one or more downlink transmit beams on which to transmit unicast downlink control information and/or user data traffic to the UE 502. In some examples, the selected downlink transmit beam(s) have the highest gain from the beam measurement report. In some examples, the UE 502 can further identify the downlink transmit beams selected by the base station from the beam measurements. Transmission of the beam measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The base station 504 or the UE 502 may further select a corresponding downlink receive beam on the UE 502 for each selected serving downlink transmit beam to form a respective downlink beam pair link (BPL) for each selected serving downlink transmit beam. For example, the UE 502 can utilize the beam measurements to select the corresponding downlink receive beam for each serving downlink transmit beam. In some examples, the selected downlink receive beam to pair with a particular downlink transmit beam may have the highest gain for that particular downlink transmit beam.

In one example, a single downlink transmit beam (e.g., beam 506d) on the base station 504 and a single downlink receive beam (e.g., beam 508c) on the UE may form a single downlink BPL used for communication between the base station 504 and the UE 502. In another example, multiple downlink transmit beams (e.g., beams 506c, 506d, and 506e) on the base station 504 and a single downlink receive beam (e.g., beam 508c) on the UE 502 may form respective downlink BPLs used for communication between the base station 504 and the UE 502. In another example, multiple downlink transmit beams (e.g., beams 506c, 506d, and 506e) on the base station 504 and multiple downlink receive beams (e.g., beams 508c and 508d) on the UE 502 may form multiple downlink BPLs used for communication between the base station 504 and the UE 502. In this example, a first downlink BPL may include downlink transmit beam 506c and downlink receive beam 508c, a second downlink BPL may include downlink transmit beam 506d and downlink receive beam 508c, and a third downlink BPL may include downlink transmit beam 506e and downlink receive beam 508d.

When the channel is reciprocal, the above-described downlink beam management scheme may also be used to select one or more uplink BPLs for uplink communication from the UE 502 to the base station 504. For example, the downlink BPL formed of beams 506d and 508e may also serve as an uplink BPL. Here, beam 508c is utilized as an uplink transmit beam, while beam 506d is utilized as an uplink receive beam.

In an example of an uplink beam management scheme, the UE 502 may be configured to sweep or transmit on each of a plurality of uplink transmit beams 508a-508e. For example, the UE 502 may transmit an SRS on each beam in the different beam directions. In addition, the base station 504 may be configured to receive the uplink beam reference signals on a plurality of uplink receive beams 506a-506h. In some examples, the base station 504 searches for and identifies each of the uplink transmit beams 508a-508e based on the beam reference signals. The base station 504 then performs beam measurements (e.g., RSRP, SINR, RSRQ, etc.) on the beam reference signals on each of the uplink receive beams 506a-506h to determine the respective beam quality of each of the uplink transmit beams 508a-508e as measured on each of the uplink receive beams 506a-506h.

The base station 504 may then select one or more uplink transmit beams on which the UE 502 will transmit unicast downlink control information and/or user data traffic to the base station 504. In some examples, the selected uplink transmit beam(s) have the highest gain. The base station 504 may further select a corresponding uplink receive beam on the base station 504 for each selected serving uplink transmit beam to form a respective uplink beam pair link (BPL) for each selected serving uplink transmit beam. For example, the base station 504 can utilize the uplink beam measurements to select the corresponding uplink receive beam for each serving uplink transmit beam. In some examples, the selected uplink receive beam to pair with a particular uplink transmit beam may have the highest gain for that particular uplink transmit beam.

The base station 504 may then notify the UE 502 of the selected uplink transmit beams. For example, the base station 504 may provide the SRS resource identifiers (SRIs) identifying the SRSs transmitted on the selected uplink transmit beams. In some examples, the base station 504 may apply each selected uplink transmit beam (and corresponding uplink receive beam) to an uplink signal (e.g., PUCCH, PUSCH, etc.) and transmit the respective SRIs associated with the selected uplink transmit beams applied to each uplink signal to the UE 502. When the channel is reciprocal, the above-described uplink beam management scheme may also be used to select one or more downlink BPLs for downlink communication from the base station 504 to the UE 502. For example, the uplink BPLs may also be utilized as downlink BPLs.

In various aspects of the disclosure, the base station 504 may include a beam manager 512 that may configure the UE 502 with a semi-static uplink beam assignment for one or more uplink signals. Such a semi-static uplink beam assignment may be referred to herein as a sticky uplink beam assignment. A beam manager 510 within the UE 502 may use the sticky uplink beam assignment for transmission of uplink signals until a new sticky uplink beam assignment is received. In some examples, the sticky uplink beam assignment may include an uplink beam ID, such as an SRI indicated by DCI for PUSCH or uplink spatial relation indicated by MAC-CE for PUCCH. The uplink transmit beam identified by the uplink beam ID may be used by the UE 502 for transmission of all uplink signals (e.g., PUCCH and/or PUSCH) or for certain uplink channel types (e.g., dynamic PUSCH, configured grant (CG), PUCCH, etc.) until a new uplink beam ID is received. In some examples, the beam manager 510 within the UE 502 may be configured with multiple sticky uplink beam assignments, each corresponding to a different uplink channel type. By utilizing a sticky uplink beam assignment for uplink signal transmission, the internal UE timer delays and corresponding scheduling constraints at the base station may be eliminated. In addition, the overhead may be reduced by avoiding dynamic uplink beam assignments.

Figure 6:
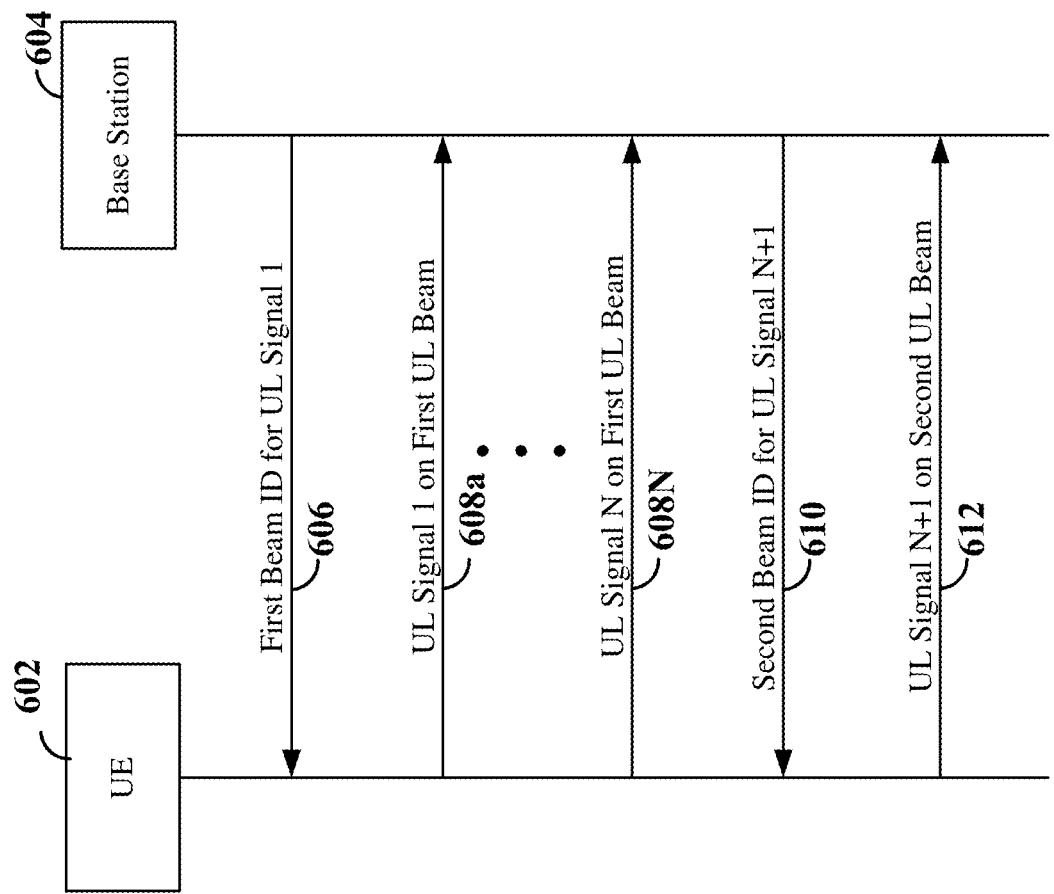
FIG. 6 is a signaling diagram illustrating an example of signaling between a UE and a base station for sticky uplink beam assignment according to some aspects.

FIG. 6 illustrates an example of signaling between a UE 602 and a base station 604 for sticky uplink beam assignment according to some aspects. The UE 602 may correspond to any of the UEs or scheduled entities shown in FIGS. 1, 2, 4, and/or 5. In addition, the base station 604 may correspond to any of the base stations or scheduling entities shown in FIGS. 1, 2, 4, and/or 5.

At 606, the base station 604 may select a first uplink beam (e.g., uplink beam 508c shown in FIG. 5) for a first uplink signal (UL Signal 1) and transmit a first beam ID (e.g., beam ID 702 shown in FIG. 7) identifying the first uplink beam to the UE 602. The first uplink beam 508c may be one of a plurality of uplink beams (e.g., uplink transmit beams 508a-508e shown in FIG. 5) that may be formed by the UE 602. In some examples, the base station 604 may transmit the first beam ID within DCI (e.g., DCI 316 shown in FIG. 3 or DCI 814a shown in FIG. 8) scheduling transmission of a PUSCH (e.g., a dynamic PUSCH or CG, such as the PUSCH/CG 320 shown in FIG. 3) or within a MAC-CE (e.g., MAC-CE 814b shown in FIG. 8) for a PUCCH resource. For example, the first beam ID may be an SRI included in DCI or an uplink spatial relation indicator included in a MAC-CE (e.g., the MAC-CE 814b carrying the uplink spatial relation indicator shown in FIG. 8).

At 608a-608N, the UE 602 may transmit the first uplink signal (e.g., a PUSCH or PUCCH) on the first uplink beam 508c and one or more subsequent uplink signals (e.g., UL Signal 1 . . . UL Signal N, each of which may be a PUSCH or PUCCH) on the first uplink beam 508c in accordance with a sticky uplink beam assignment associated with the first uplink beam. The base station 604 may define the sticky uplink beam assignment by selecting the first uplink beam 508c for the first uplink signal and associating the first uplink beam 508c with the one or more subsequent uplink signals.

In some examples, the base station 604 may select the first uplink beam 508c for all uplink signals (e.g., PUSCH and PUCCH) transmitted by the UE 602. In other examples, the base station 604 may select the first uplink beam 508c for one or more uplink channel types, such as PUCCH, dynamically scheduled PUSCH, and/or CGs. For example, the base station 604 may select the first uplink beam 508c for the transmission of PUSCH and CG signals by the UE 602. In this example, the base station 604 may further select a different uplink beam (e.g., uplink beam 508d) identified by a different beam ID for the transmission of PUCCH signals. In still other examples, the base station 604 may select the first uplink beam 508c for one or more grants of one or more channel types. For example, the base station 604 may select the first beam ID associated with the first uplink beam 508c for dynamic PUSCH signals, uplink signals transmitted on one or more PUCCH resources, and uplink signals associated with one or more CGs. In this example, the base station may further select different uplink beams (e.g., one or more of uplink beams 508a, 508b, 508d, and 508e) for other CGs and/or other PUCCH resources. Other combinations and variations of sticky uplink beam assignments between the different uplink channel types and grants within the uplink channel types are also possible in accordance with aspects of the disclosure.

The UE 602 may determine the sticky uplink beam assignments(s) based on sticky uplink beam configuration information preconfigured on the UE 602 or provided by the base station 604. For example, the base station 604 may transmit a message (e.g., a radio resource control (RRC) message, DCI, or MAC-CE) including the sticky uplink beam configuration information. In some examples, the sticky uplink beam configuration information may indicate that the UE 602 should utilize a sticky uplink beam assignment that applies a newly received beam ID (e.g., a beam ID that is different than a previously utilized beam ID) to all channel types. For example, whenever a new SRI or new uplink spatial relation indicator is received, the UE 602 may apply the new SRI or new uplink spatial relation indicator to all uplink signals (e.g., PUSCH, PUCCH, and CG signals) transmitted by the UE 602 after receiving the new SRI or new uplink spatial relation indicator.

In other examples, the sticky uplink beam configuration information may indicate that the UE 602 should utilize a sticky uplink beam assignment that applies a newly received beam ID to one or more channel types or one or more grants of a particular channel type. The application of the new beam ID to the corresponding uplink channel types and/or grants may be based on the particular DCI or MAC-CE within which the new beam ID is received. For example, the sticky uplink beam configuration information may indicate that the UE 602 should utilize a first sticky uplink beam assignment that applies a new SRI received in DCI for a dynamic PUSCH to all subsequent dynamic PUSCH transmissions and subsequent CG transmissions, and a second sticky uplink beam assignment that applies a new uplink spatial relation indicator received in a MAC-CE for a PUCCH resource to all subsequent PUCCH transmissions. As another example, the sticky uplink beam configuration information may indicate that the UE 602 should utilize respective sticky uplink beam assignments that apply a first new SRI received in first DCI for a first CG to subsequent transmissions of the first CG, a second new SRI received in second DCI for a second CG or a dynamic PUSCH to all other dynamic PUSCH and CG transmissions, a first new uplink spatial relation indicator received in a first MAC-CE for a first PUCCH resource to transmissions on the first PUCCH resource, and a second new uplink spatial relation indicator received in a second MAC-CE for a second PUCCH resource to transmissions on all other PUCCH resources.

In some examples, the sticky uplink beam configuration information indicating the sticky uplink beam assignment may be included in the DCI carrying the scheduling information for a new dynamic PUSCH or new CG. For example, the DCI may include an indication to utilize the first uplink beam for transmission of the new dynamic PUSCH or new CG signal. In some examples, the indication may include an SRI codepoint indicating to use a last uplink beam (e.g., the first uplink beam) previously utilized by the UE for a transmission (e.g., the first uplink signal) to the base station 604. In other examples, the indication may include an SRI codepoint of the first uplink beam. In some examples, an SRI codepoint may include three bits, and each combination of the three bits may indicate a particular uplink beam. As another example, the DCI may exclude an SRI codepoint, and thus, the DCI may have a reduced size in comparison to DCI containing an SRI codepoint. In this example, the sticky uplink beam configuration information (e.g., preconfigured on the UE or transmitted to the UE from the base station) may indicate that the UE should utilize a sticky uplink beam assignment utilizing the last uplink beam (e.g., the first uplink beam) for an uplink transmission scheduled by a reduced size DCI.

Based on the sticky uplink beam configuration information and the first beam ID received by the UE 602, the UE 602 can utilize the first uplink beam for transmission of the first uplink signal and the one or more subsequent uplink signals. In some examples, the UE 602 may apply a timer between receiving the first beam ID for the first uplink signal and transmitting the first uplink signal to enable the UE 602 to switch the uplink transmit beam to the first uplink beam. In addition, for each of the one or more subsequent uplink signals, the UE 602 may ignore the timer as the UE 602 is already configured for beamforming using the first uplink beam (e.g., the UE 602 does not need to switch the uplink transmit beam).

At 610, the base station 604 may select a second uplink beam for a second uplink signal (UL Signal N+1) and transmit a second beam ID identifying the second uplink beam to the UE 602. The second beam ID may be a new beam ID that is different from the first beam ID. In some examples, the base station 604 may transmit the second beam ID within DCI scheduling transmission of a PUSCH (e.g., a dynamic PUSCH or CG) or within a MAC-CE for a PUCCH resource. For example, the second beam ID may be an SRI included in DCI or an uplink spatial relation indicator included in a MAC-CE.

At 612, the UE 602 may transmit the second uplink signal (e.g., UL Signal N+1, which may be a PUSCH or PUCCH) on the second uplink beam. In addition, the UE 602 may further transmit one or more subsequent uplink signals (e.g., PUSCH and/or PUCCH) on the second uplink beam in accordance with a sticky uplink beam assignment associated with the second uplink beam. The sticky uplink beam assignment for the second uplink beam may be determined based on sticky uplink beam configuration information, as described above.

Figure 7:
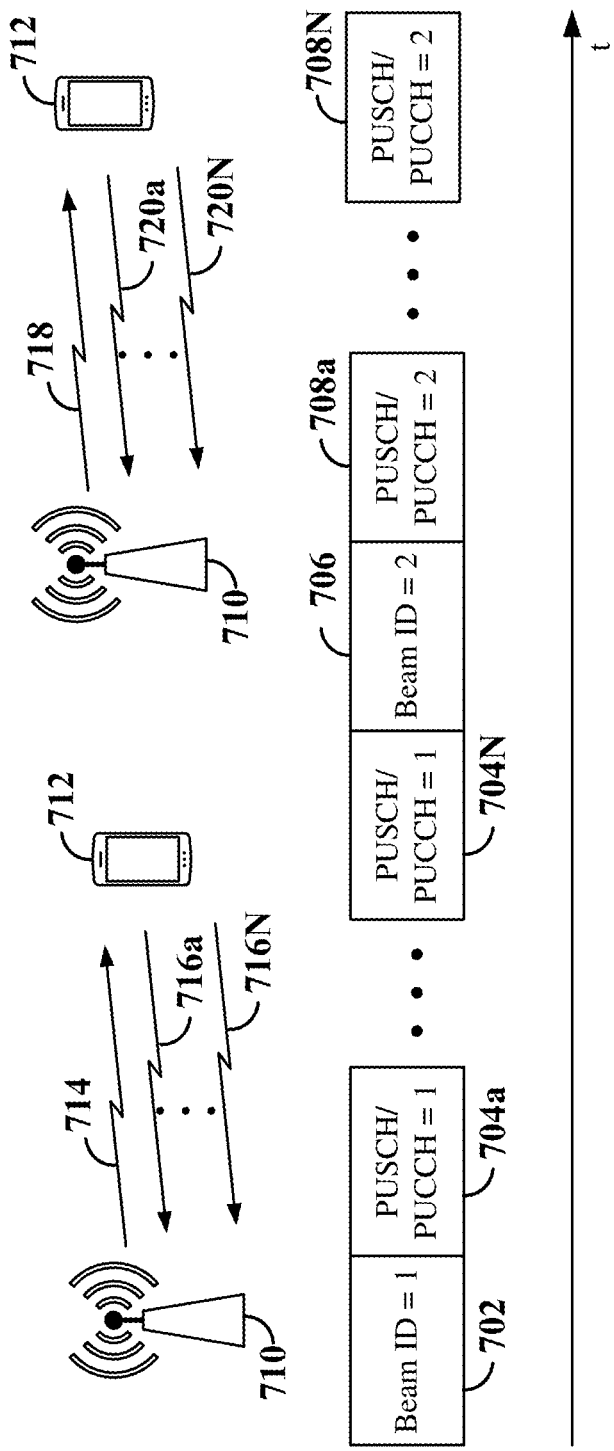
FIG. 7 is a diagram illustrating an example of a sticky uplink beam assignment for all uplink signals according to some aspects.

FIG. 7 is a diagram illustrating an example of a sticky uplink beam assignment for all uplink signals according to some aspects. FIG. 7 illustrates communication between a base station 710 and a UE 712 over time (t), which is shown divided into a plurality of time resources 702-708. Each time resource 702-708 may include one or more symbols, slots, subframes, or frames. Within a first time resource 702, the UE 712 may receive a first beam ID 714 (Beam ID=1) identifying a first uplink beam for transmission of a first uplink signal 716a (e.g., a PUCCH or PUSCH) from the base station 710. The first time resource 702 may include a first slot or set of one or more symbols within the first slot. The first beam ID 714 may be transmitted, for example, within a DCI carrying an SRI associated with the first uplink signal or a MAC-CE carrying an uplink spatial relation indicator associated with the first uplink signal.

Within time resources 704a-704N, the UE 712 may then subsequently transmit the first uplink signal and all other uplink signals 716a-716N on the first uplink beam (e.g., PUSCH/PUCCH=1). Here, time resources 704a-704N may include a set of one or more contiguous symbols, slots, subframes, or frames. Within time resource 706 (e.g., one or more symbols of a subsequent slot), the UE 712 may receive a second beam ID 718 (Beam ID=2) identifying a second uplink beam for transmission of a second uplink signal 720a (e.g., a PUCCH or PUSCH) from the base station 710. The UE 712 may then transmit the second uplink signal and all other uplink signals 720a-720N on the second uplink beam (e.g., PUSCH/PUCCH=2) within time resources 708a-708N.

Figure 8:
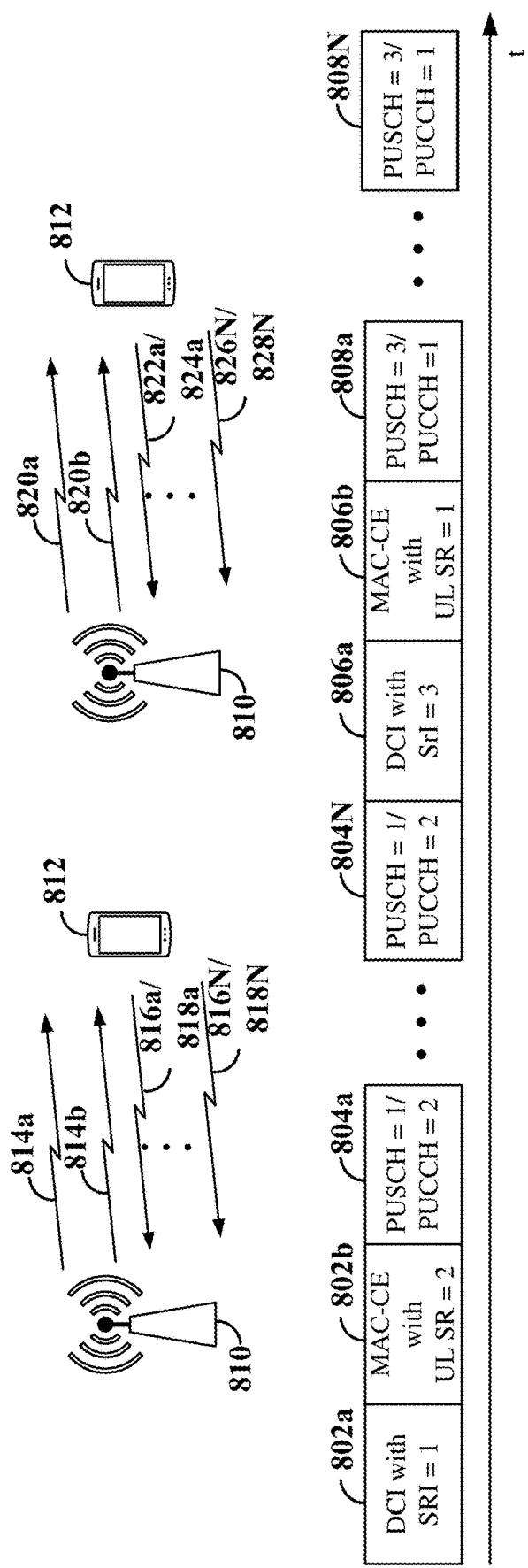
FIG. 8 is a diagram illustrating an example of sticky uplink beam assignments per channel type according to some aspects.

FIG. 8 is a diagram illustrating an example of sticky uplink beam assignments per channel type according to some aspects. FIG. 7 illustrates communication between a base station 810 and a UE 812 over time (t), which is shown divided into a plurality of time resources 802-808. Each time resource 802-808 may include one or more symbols, slots, subframes, or frames. Within a first time resource 802a, the UE 812 may receive DCI 814a carrying an SRI (SRI=1) identifying a first uplink beam for transmission of a first PUSCH 816a (e.g., dynamic or CG) from the base station 810. In addition, within a second time resource 802b, the UE 812 may receive a MAC-CE 814b carrying an uplink spatial relation indicator (UL SR=2) identifying a second uplink beam for transmission of a first PUCCH 818a (e.g., activating a first PUCCH resource) from the base station 810. The first time resource 802a and second time resource 802b may each correspond to different slots or respective sets of one or more symbols within the same slot.

Within time resources 804a-804N, the UE 812 may then subsequently transmit the first PUSCH and all other PUSCH signals 816a-816N on the first uplink beam (e.g., PUSCH=1). In addition, the UE may transmit the first PUCCH and all other PUCCH signals 818a-818N on the second uplink beam (PUCCH=2). Here, time resources 804a-804N may include a set of one or more contiguous symbols, slots, subframes, or frames. Within time resource 806a (e.g., one or more symbols of a subsequent slot), the UE 812 may receive DCI 820a carrying a new SRI (SRI=3) identifying a first uplink beam for transmission of an additional PUSCH 822a (e.g., dynamic or CG) from the base station 810. In addition, within time resource 806b, the UE 812 may receive a MAC-CE 820b carrying a new uplink spatial relation indicator (UL SR=1) identifying the first uplink beam for transmission of an additional PUCCH 824a (e.g., activating the same PUCCH resource or an additional PUCCH resource) from the base station 810. Time resources 806a and 806b may each correspond to different slots or respective sets of one or more symbols within the same slot. The UE 812 may then transmit the additional PUSCH and all other PUSCH signals 822a-822N on the third uplink beam (e.g., PUSCH=3) within time resources 808a-808N. In addition, the UE 812 may transmit the additional PUCCH and all other PUCCH signals 824a-824N on the first uplink beam (PUCCH=1).

Figure 9:
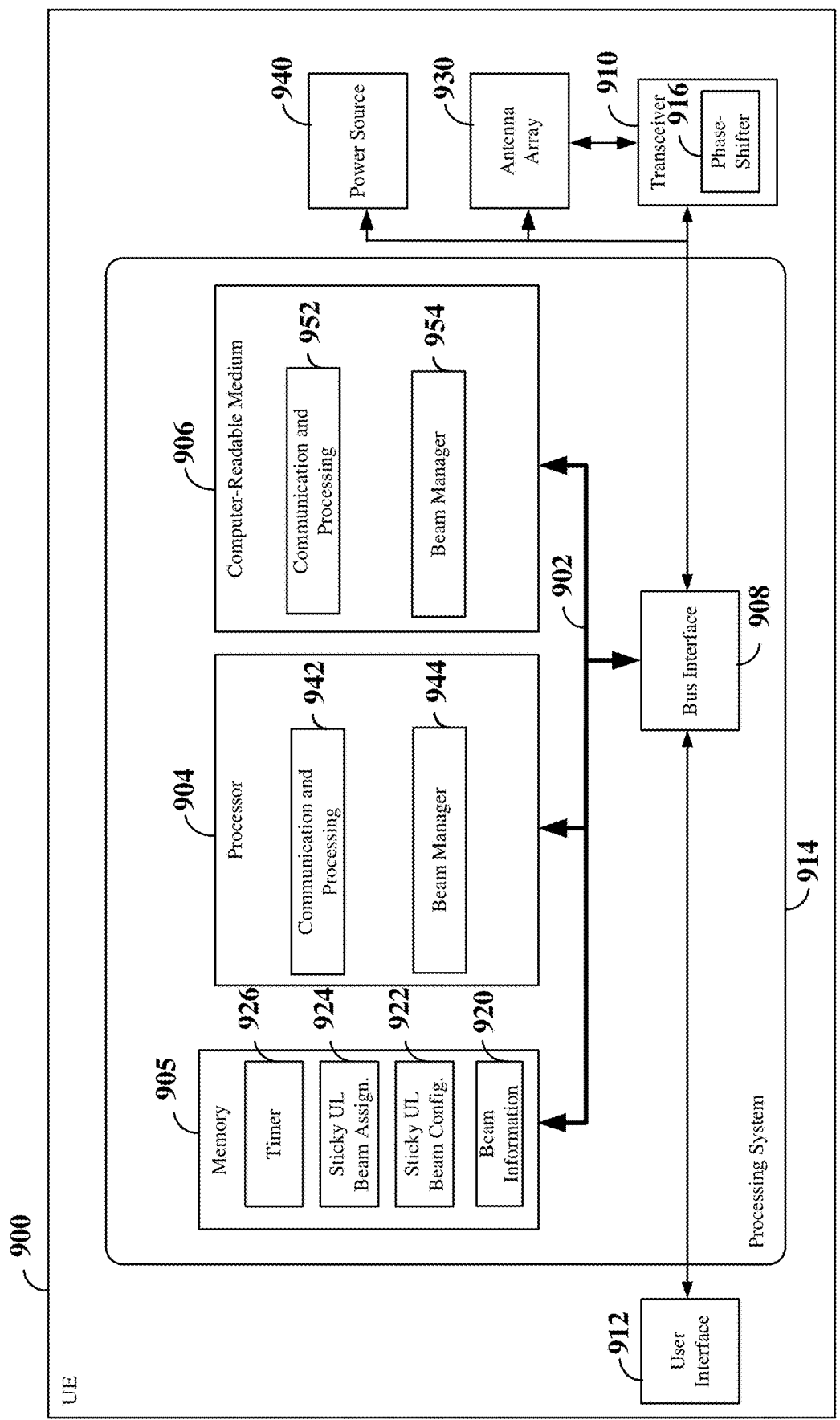
FIG. 9 is a block diagram illustrating an example of a hardware implementation for a UE employing a processing system according to some aspects.

FIG. 9 is a conceptual diagram illustrating an example of a hardware implementation for an exemplary UE 900 employing a processing system 914. For example, the UE 900 may be any of the UEs or scheduled entities illustrated in any one or more of FIGS. 1, 2, and/or 4-6.

The UE 900 may be implemented with a processing system 914 that includes one or more processors 904. Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 900 may be configured to perform any one or more of the functions described herein. That is, the processor 904, as utilized in a UE 900, may be used to implement any one or more of the processes described below in connection with FIG. 9.

The processor 904 may in some instances be implemented via a baseband or modem chip and in other implementations, the processor 904 may itself comprise a number of devices distinct and different from a baseband or modem chip (e.g., in such scenarios as may work in concert to achieve aspects discussed herein). And as mentioned above, various hardware arrangements and components outside of a baseband modem processor can be used in implementations, including RF-chains, power amplifiers, modulators, buffers, interleavers, adders/summers, etc.

In this example, the processing system 914 may be implemented with a bus architecture, represented generally by the bus 902. The bus 902 may include any number of interconnecting buses and bridges depending on the specific application of the processing system 914 and the overall design constraints. The bus 902 communicatively couples together various circuits including one or more processors (represented generally by the processor 904), a memory 905, and computer-readable media (represented generally by the computer-readable medium 906). The bus 902 may also link various other circuits such as timing sources, peripherals, voltage regulators, and power management circuits, which are well known in the art, and therefore, will not be described any further. A bus interface 908 provides an interface between the bus 902 and a transceiver 910. The transceiver 910 provides a means for communicating with various other apparatus over a transmission medium (e.g., air interface). In some examples, the transceiver 910 may include a phase-shifter 916 for digital and/or analog beamforming via one or more antenna array(s) 930. A user interface 912 (e.g., keypad, display, speaker, microphone, joystick) may also be provided.

The processor 904 is responsible for managing the bus 902 and general processing, including the execution of software stored on the computer-readable medium 906. The software, when executed by the processor 904, causes the processing system 914 to perform the various functions described below for any particular apparatus. The computer-readable medium 906 and the memory 905 may also be used for storing data that is manipulated by the processor 904 when executing software.

One or more processors 904 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 906.

The computer-readable medium 906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 906 may reside in the processing system 914, external to the processing system 914, or distributed across multiple entities including the processing system 914. The computer-readable medium 906 may be embodied in a computer program product. In some examples, the computer-readable medium 906 may be part of the memory 905. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 904 may include circuitry configured for various functions. For example, the processor 904 may include communication and processing circuitry 942, configured to communicate with a base station, such as a gNB. In some examples, the communication and processing circuitry 942 may include one or more hardware components that provide the physical structure that performs processes related to wireless communication (e.g., signal reception and/or signal transmission) and signal processing (e.g., processing a received signal and/or processing a signal for transmission).

In some examples, the communication and processing circuitry 942 may be configured to receive and process downlink beamformed signals at a mmWave frequency or a sub-6 GHz frequency via the transceiver 910 and the antenna array 930 (e.g., using the phase-shifter 916). In addition, the communication and processing circuitry 942 may be configured to generate and transmit uplink beamformed signals at a mmWave frequency or a sub-6 GHz frequency via the transceiver 910 and antenna array 930 (e.g., using the phase-shifter 916).

The communication and processing circuitry 942 may further be configured to receive a beam ID from the base station. The beam ID may identify an uplink beam of a plurality of uplink beams that may be formed using the phase-shifter 916 and antenna array 930. In some examples, the beam ID may be an SRI received within control information (e.g., DCI) scheduling a data channel (e.g., a PUSCH, such as a dynamic PUSCH or CG). In other examples, the beam ID may be an uplink spatial relation indicator received within a MAC-CE activating a control channel (e.g., a PUCCH resource). Beam information 920 correlating each of the beam IDs (SRIs and uplink spatial relation indicators) with the corresponding uplink beams (e.g., logical antenna port indicating one or more antenna elements of the antenna array 930 and applicable phase-shifting used to form the respective uplink beam) may be stored, for example, in memory 905.

The communication and processing circuitry 942 may further be configured to receive sticky uplink beam configuration information 922 from the base station indicating one or more sticky uplink beam assignment(s) 924. For example, the communication and processing circuitry 942 may be configured to receive and process a message (e.g., a radio resource control (RRC) message, DCI, or MAC-CE) including the sticky uplink beam configuration information 922. The communication and processing circuitry 942 may further store the sticky uplink beam configuration information 922 and sticky uplink beam assignment(s) 924 within, for example, memory 905. In other examples, the sticky uplink beam configuration information 922 may be preconfigured on the UE and/or determined based on, for example, 3GPP specifications.

In some examples, the sticky uplink beam configuration information 922 may indicate that the UE 900 should utilize a sticky uplink beam assignment 924 that applies a newly received beam ID (e.g., a beam ID that is different than a previously utilized beam ID) to all uplink channel types (e.g., dynamic PUSCH, CG, PUCCH, etc.) or to one or more uplink channel types or grants within a particular uplink channel type. In some examples, the sticky uplink beam configuration information 922 may include an SRI codepoint included in DCI that indicates a sticky uplink beam assignment 924 in which a last uplink beam utilized for an uplink transmission (e.g., any uplink transmission or an uplink transmission of a particular channel type or CG) should be utilized for a current uplink signal transmission. In some examples, the SRI codepoint is the SRI codepoint of the last uplink beam or an SRI codepoint indicating to utilize the last uplink beam (e.g., a special SRI codepoint indicating to utilize a last uplink beam). In other examples, the sticky uplink beam configuration information 922 may be utilized to determine a sticky uplink beam assignment when DCI excluding an SRI codepoint (e.g., DCI having a reduced size) is received from the base station.

The communication and processing circuitry 942 may further be configured to transmit an uplink signal and at least one subsequent uplink signal on the same uplink beam in accordance with the sticky uplink beam assignment 924 associated with uplink beam. In some examples, the communication and processing circuitry 942 may be configured to transmit a first uplink signal of a first uplink channel type and at least one subsequent signal of the first uplink channel type on a first uplink beam in accordance with a first sticky uplink beam assignment 924. In addition, the communication and processing circuitry 942 may be configured to transmit a second uplink signal of a second uplink channel type and at least one additional uplink signal of the second uplink channel type on a second uplink beam in accordance with a second sticky uplink beam assignment 924. The communication and processing circuitry 942 may further be configured to execute communication and processing software 952 stored in the computer-readable medium 906 to implement one or more of the functions described herein.

The processor 904 may further include beam manager circuitry 944, configured to identify an uplink beam on which to transmit an uplink signal (e.g., a PUCCH or PUSCH) based on a received beam ID or a sticky uplink beam assignment 924. For example, the beam manager circuitry 944 may be configured to identify a first uplink beam for transmission of a first uplink signal based on a first beam ID received for the first uplink signal. For example, the first beam ID may correspond to an SRI received in DCI scheduling a PUSCH (e.g., a dynamic PUSCH or CG) or an uplink spatial relation indicator received in a MAC-CE activating a PUCCH resource. The beam manager circuitry 944 may further be configured to instruct the communication and processing circuitry 942 to transmit the first uplink signal on the first uplink beam. The beam manager circuitry 944 may further be configured to apply a timer 926 between receipt of the first beam ID and transmission of the first uplink signal to provide sufficient time for the communication and processing circuitry 942 to control the phase-shifter 916 and antenna array 930 to switch from a previous uplink beam to the first uplink beam.

The beam manager circuitry 944 may further be configured to instruct the communication and processing circuitry 942 to utilize the first uplink beam for transmission of at least one subsequent uplink signal based on a sticky uplink beam assignment 924 associated with the first uplink beam. In some examples, based on the sticky uplink beam assignment 924, the beam manager circuitry 944 may instruct the communication and processing circuitry 942 to utilize the first uplink beam for all channel types (e.g., dynamic PUSCH, PUCCH, and CG signals) transmitted after receiving the first beam ID. In other examples, based on the sticky uplink beam assignment 924, the beam manager circuitry 944 may instruct the communication and processing circuitry 942 to utilize the first uplink beam for one or more channel types or one or more grants of a particular channel type.

In some examples, the beam manager circuitry 944 may be configured to determine the sticky uplink beam assignment 924 from the sticky uplink beam configuration information 922. For example, the sticky uplink beam configuration information 922 may indicate to utilize a sticky uplink beam assignment 924 that applies a last received beam ID (e.g., the first beam ID) to all uplink signals until a new beam ID different than the first beam ID is received (e.g., a new SRI or new uplink spatial relation indicator). In this example, the beam manager circuitry 944 may be configured to instruct the communication and processing circuitry 942 to utilize the first uplink beam for all subsequent uplink signals until a new beam ID is received. As another example, the sticky uplink beam configuration information 922 may indicate to utilize a respective sticky uplink beam assignment 924 for one or more channel types or grants within a particular channel type. Each sticky uplink beam assignment 924 may apply a respective last received beam ID in a particular channel type (or set of two or more channel types and/or grants within particular channel types) to subsequent uplink signals of that particular channel type (or set of two or more channel types and/or grants within particular channel types) until a new beam ID for that particular channel type (or set of two or more channel types and/or grants within particular channel types) is received. In this example, the beam manager circuitry 944 may be configured to instruct the communication and processing circuitry 942 to utilize the first uplink beam for subsequent uplink signals associated with one or more channel types and/or uplink signals associated with one or more grants (e.g., CGs and/or PUCCH resources) until a new beam ID is received.

As yet another example, the sticky uplink beam configuration information 922 may indicate to utilize a sticky uplink beam assignment 924 that applies a last received beam ID (e.g., the first beam ID) to PUSCH signals scheduled with a reduced size DCI. In this example, the beam manager circuitry 944 may be configured to utilize the first uplink beam for each reduced size DCI scheduling a PUSCH after receipt of the first beam ID. In other examples, the sticky uplink beam configuration information 922 indicating the sticky uplink beam assignment 924 may be included in the DCI carrying the scheduling information for a new dynamic PUSCH or new CG. For example, the DCI may include an indication to utilize the first uplink beam for transmission of the new dynamic PUSCH or new CG signal. In some examples, the indication may include an SRI codepoint indicating to use a last uplink beam (e.g., the first uplink beam) previously utilized by the UE for a transmission (e.g., the first uplink signal) to the base station. In other examples, the indication may include an SRI codepoint of the first uplink beam.

In examples in which the beam manager circuitry 944 instructs the communication and processing circuitry 942 to utilize the first uplink beam for at least one subsequent uplink signal, the beam manager circuitry 944 may further be configured to ignore the timer 926 as the antenna array 930 is already configured for beamforming on the first uplink beam.

Upon receiving a new beam ID different than the first beam ID, the beam manager circuitry 944 may be configured to update the sticky uplink beam assignment associated with the first beam ID to the new beam ID based on the sticky uplink beam configuration information 922. For example, the beam manager circuitry 944 may be configured to update a sticky uplink beam assignment 924 to apply a new SRI received in DCI or a new uplink spatial relation indicator to all subsequent uplink signals based on the sticky uplink beam configuration information 922. As another example, the beam manager circuitry 944 may be configured to update a first sticky uplink beam assignment 924 to apply a new SRI received in DCI for a dynamic PUSCH to all subsequent dynamic PUSCH transmissions and subsequent CG transmissions, and a second sticky uplink beam assignment 924 to apply a new uplink spatial relation indicator received in a MAC-CE for a PUCCH resource to all subsequent PUCCH transmissions based on the sticky uplink beam configuration information 922.

As another example, the beam manager circuitry 944 may be configured to update respective sticky uplink beam assignments 924 to apply a first new SRI received in first DCI for a first CG to subsequent transmissions of the first CG, a second new SRI received in second DCI for a second CG or a dynamic PUSCH to all other dynamic PUSCH and CG transmissions, a first new uplink spatial relation indicator received in a first MAC-CE for a first PUCCH resource to transmissions on the first PUCCH resource, and a second new uplink spatial relation indicator received in a second MAC-CE for a second PUCCH resource to transmissions on all other PUCCH resources. The beam manager circuitry 944 may further be configured to execute beam manager software 954 stored in the computer-readable medium 906 to implement one or more of the functions described herein.

Figure 10:
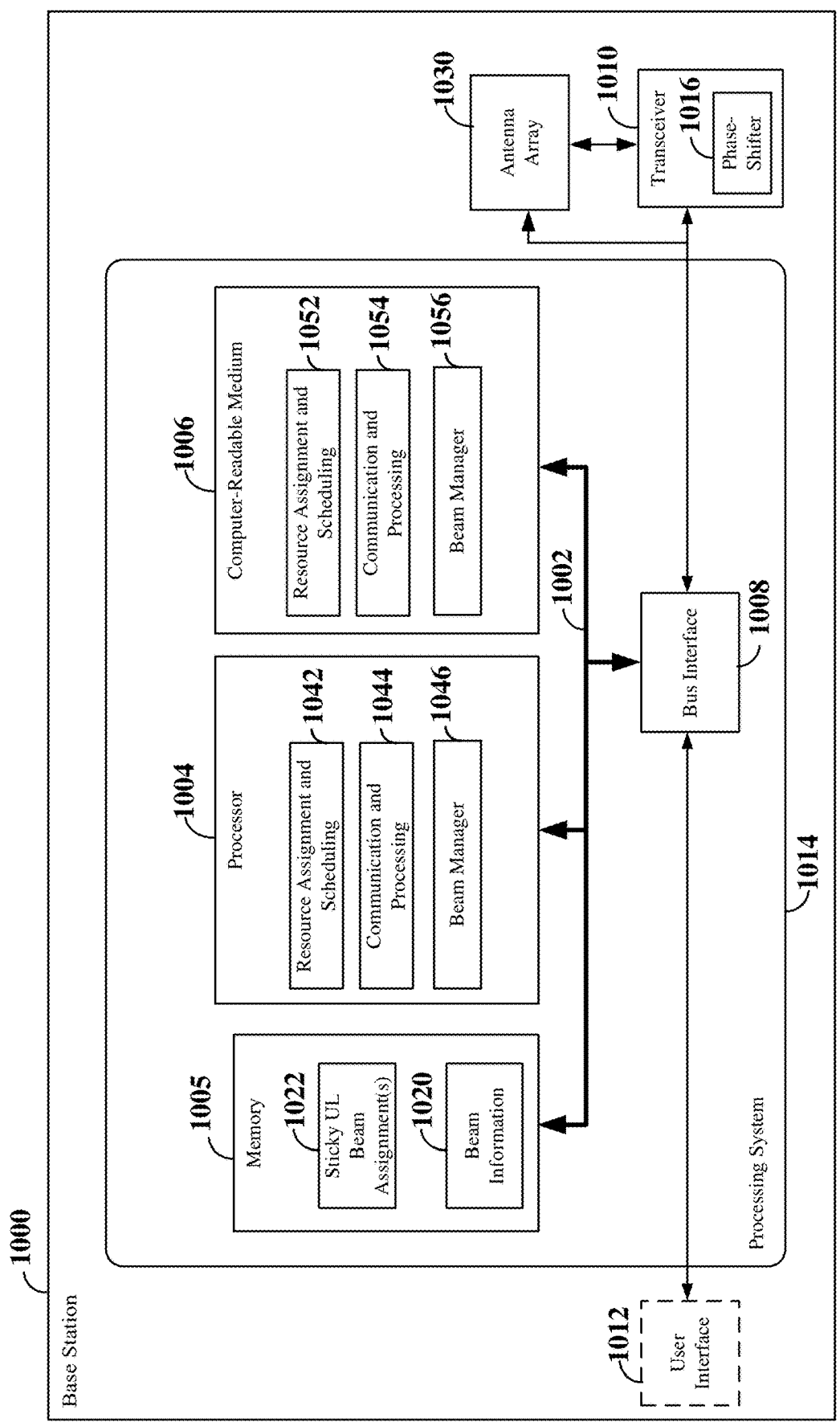
FIG. 10 is a block diagram illustrating an example of a hardware implementation for a base station employing a processing system according to some aspects.

FIG. 10 is a conceptual diagram illustrating an example of a hardware implementation for an exemplary base station 1000 employing a processing system 1014. For example, the base station 1000 may be any of the base stations (e.g., gNBs) or scheduling entities illustrated in any one or more of FIGS. 1, 2, and/or 4-6.

In accordance with various aspects of the disclosure, an element, or any portion of an element, or any combination of elements may be implemented with a processing system 1014 that includes one or more processors 1004. The processing system 1014 may be substantially the same as the processing system 914 illustrated in FIG. 9, including a bus interface 1008, a bus 1002, memory 1005, a processor 1004, and a computer-readable medium 1006. Furthermore, the base station 1000 may include an optional user interface 1012 and a transceiver 1010 substantially similar to those described above in FIG. 9. In some examples, the transceiver 1010 may include a phase-shifter 1016 for digital and/or analog beamforming via one or more antenna array(s) 1030. The processor 1004, as utilized in a base station 1000, may be used to implement any one or more of the processes described below.

In some aspects of the disclosure, the processor 1004 may include circuitry configured for various functions. For example, the processor 1004 may include resource assignment and scheduling circuitry 1042, configured to generate, schedule, and modify a resource assignment or grant of time-frequency resources (e.g., a set of one or more resource elements). For example, the resource assignment and scheduling circuitry 1042 may schedule time-frequency resources within a plurality of time division duplex (TDD) and/or frequency division duplex (FDD) subframes, slots, and/or mini-slots to carry user data traffic and/or control information to and/or from multiple UEs.

In some examples, the resource assignment and scheduling circuitry 1042 may be configured to schedule resources for the transmission of a beam ID for an uplink signal to a user equipment (UE) in wireless communication with the base station 1000. The beam ID may identify an uplink beam of a plurality of uplink beams (e.g., uplink transmit beams) that may be formed by the UE. In some examples, the resource assignment and scheduling circuitry 1042 may be configured to schedule resources for the transmission of DCI including an SRI corresponding to the beam ID or a MAC-CE including an uplink spatial relation indicator corresponding to the beam ID. The resource assignment and scheduling circuitry 1042 may further be configured to schedule resources for the transmission of sticky uplink beam configuration information indicating one or more sticky uplink beam assignment(s) to the UE. In some examples, the resource assignment and scheduling circuitry 1042 may be configured to schedule resources for the transmission of an RRC message, DCI, or MAC-CE including the sticky uplink beam configuration information.

The resource assignment and scheduling circuitry 1042 may further be configured to schedule resources for the transmission by the UE of an uplink signal and at least one subsequent uplink signal on the same uplink beam in accordance with the sticky uplink beam assignment associated with uplink beam. In some examples, the resource assignment and scheduling circuitry 1042 may be configured to schedule resources for the transmission by the UE of a first uplink signal of a first uplink channel type and at least one subsequent signal of the first uplink channel type on a first uplink beam in accordance with a first sticky uplink beam assignment. In addition, the resource assignment and scheduling circuitry 1042 may be configured to schedule resources for the transmission by the UE of a second uplink signal of a second uplink channel type and at least one additional uplink signal of the second uplink channel type on a second uplink beam in accordance with a second sticky uplink beam assignment. The resource assignment and scheduling circuitry 1042 may further be configured to execute resource assignment and scheduling software 1052 stored in the computer-readable medium 1006 to implement one or more of the functions described herein.

The processor 1004 may further include communication and processing circuitry 1044, configured to communicate with the UE. In some examples, the communication and processing circuitry 1044 may include one or more hardware components that provide the physical structure that performs processes related to wireless communication (e.g., signal reception and/or signal transmission) and signal processing (e.g., processing a received signal and/or processing a signal for transmission).

In some examples, the communication and processing circuitry 1044 may be configured to receive and process uplink beamformed signals at a mmWave frequency or a sub-6 GHz frequency via the transceiver 1010 and the antenna array 1030 (e.g., using the phase-shifter 1016). In addition, the communication and processing circuitry 1044 may be configured to generate and transmit uplink beamformed signals at a mmWave frequency or a sub-6 GHz frequency via the transceiver 1010 and antenna array 1030 (e.g., using the phase-shifter 1016).

The communication and processing circuitry 1044 may further be configured to generate and transmit a beam ID for an uplink signal to be transmitted by the UE. In some examples, the beam ID may be an SRI transmitted within control information (e.g., DCI) scheduling a data channel (e.g., a PUSCH, such as a dynamic PUSCH or CG). In other examples, the beam ID may be an uplink spatial relation indicator transmitted within a MAC-CE activating a control channel (e.g., a PUCCH resource). Beam information 1020 including each of the beam IDs (SRIs and uplink spatial relation indicators) may be stored, for example, in memory 1005. The beam information 1020 may further include one or more L1 measurement report and/or uplink beam measurement information.

The communication and processing circuitry 1044 may further be configured to transmit sticky uplink beam configuration information to the UE. The sticky uplink beam configuration information may indicate one or more sticky uplink beam assignment(s) 1022 selected by the base station 1000. For example, the communication and processing circuitry 1044 may be configured to generate and transmit a message (e.g., a RRC message, DCI, or MAC-CE) including the sticky uplink beam configuration information.

In some examples, the sticky uplink beam configuration information may indicate that the UE should utilize a sticky uplink beam assignment 1022 that applies a newly received beam ID (e.g., a beam ID that is different than a previously utilized beam ID) to all uplink channel types (e.g., dynamic PUSCH, CG, PUCCH, etc.) or to one or more uplink channel types or grants within a particular uplink channel type. In some examples, the sticky uplink beam configuration information may include an SRI codepoint included in DCI that indicates a sticky uplink beam assignment 1022 in which a last uplink beam utilized for an uplink transmission (e.g., any uplink transmission or an uplink transmission of a particular channel type or CG) should be utilized for a current uplink signal transmission. In some examples, the SRI codepoint is the SRI codepoint of the last uplink beam or an SRI codepoint indicating to utilize the last uplink beam (e.g., a special SRI codepoint indicating to utilize a last uplink beam). In this example, the communication and processing circuitry 1044 may generate and transmit the DCI including the SRI codepoint indicating the sticky uplink beam assignment 1022. In other examples, the sticky uplink beam configuration information may be utilized to determine a sticky uplink beam assignment 1022 when DCI excluding an SRI codepoint (e.g., DCI having a reduced size) is transmitted to the UE. In this example, the communication and processing circuitry 1044 may generate and transmit the reduced size DCI to the UE.

The communication and processing circuitry 1044 may further be configured to receive an uplink signal and at least one subsequent uplink signal on the same uplink beam in accordance with the sticky uplink beam assignment 1022 associated with the uplink beam. In some examples, the communication and processing circuitry 1044 may be configured to receive a first uplink signal of a first uplink channel type and at least one subsequent signal of the first uplink channel type on a first uplink beam in accordance with a first sticky uplink beam assignment 1022. In addition, the communication and processing circuitry 1044 may be configured to receive a second uplink signal of a second uplink channel type and at least one additional uplink signal of the second uplink channel type on a second uplink beam in accordance with a second sticky uplink beam assignment 1022. The communication and processing circuitry 1044 may further be configured to execute communication and processing software 1054 stored in the computer-readable medium 1006 to implement one or more of the functions described herein.

The processor 1004 may further include beam manager circuitry 1046, configured to select an uplink beam for a UE to transmit an uplink signal (e.g., a PUCCH or PUSCH). For example, the beam manager circuitry 1046 may be configured to select a first uplink beam for transmission by the UE of a first uplink signal based on the beam information 1020 (e.g., the beam IDs and beam measurement, such as L1 measurement report(s) and/or uplink beam measurements). The beam manager circuitry 1046 may further be configured to instruct the resource assignment and scheduling circuitry 1042 to schedule resources to receive the uplink signal on the first uplink beam and to instruct the communication and processing circuitry 1044 to generate DCI or a MAC-CE including a first beam ID of the first uplink beam for the first uplink signal. For example, the first beam ID may correspond to an SRI transmitted in DCI scheduling a PUSCH (e.g., a dynamic PUSCH or CG) or an uplink spatial relation indicator transmitted in a MAC-CE activating a PUCCH resource. The beam manager circuitry 1046 may further be configured to instruct the communication and processing circuitry 1044 to receive the first uplink signal on the first uplink beam.

The beam manager circuitry 1046 may further be configured to define one or more sticky uplink beam assignments 1022, each associated with a respective uplink beam (beam ID), for the UE. The beam manager circuitry 1046 may then store the sticky uplink beam assignment(s) 1022 within, for example, memory 1005 for use in identifying selected uplink beams for subsequent uplink signals to be transmitted by the UE. For example, the beam manager circuitry 1046 may define a sticky uplink beam assignment 1022 associated with the first uplink beam by selecting the first uplink beam for the first uplink signal and associating the first uplink beam with the one or more subsequent uplink signals. In some examples, the beam manager circuitry 1046 may select the first uplink beam for all uplink signals (e.g., PUSCH and PUCCH) transmitted by the UE. In other examples, the beam manager circuitry 1046 may select the first uplink beam for one or more uplink channel types, such as PUCCH, dynamically scheduled PUSCH, and/or CGs. For example, the beam manager circuitry 1046 may select the first uplink beam for the transmission of PUSCH and CG signals by the UE. In this example, the beam manager circuitry 1046 may further select a different uplink beam identified by a different beam ID for the transmission of PUCCH signals. In still other examples, the beam manager circuitry 1046 may select the first uplink beam for one or more grants of one or more channel types. For example, the beam manager circuitry 1046 may select the first uplink beam for dynamic PUSCH signals, uplink signals transmitted on one or more PUCCH resources, and uplink signals associated with one or more CGs. In this example, the beam manager circuitry 1046 may further select different uplink beams for other CGs and/or other PUCCH resources.

In some examples, the beam manager circuitry 1046 may further be configured to generate sticky uplink beam configuration information indicating the sticky uplink beam assignment(s) 1022 and to transmit the sticky uplink beam configuration information to the UE. For example, the sticky uplink beam configuration information may indicate to utilize a sticky uplink beam assignment 1022 that applies a last received beam ID (e.g., the first beam ID) to all uplink signals until a new beam ID different than the first beam ID is received (e.g., a new SRI or new uplink spatial relation indicator). As another example, the sticky uplink beam configuration information may indicate to utilize a respective sticky uplink beam assignment 1022 for one or more channel types or grants within a particular channel type. Each sticky uplink beam assignment 1022 may apply a respective last received beam ID in a particular channel type (or set of two or more channel types and/or grants within particular channel types) to subsequent uplink signals of that particular channel type (or set of two or more channel types and/or grants within particular channel types) until a new beam ID for that particular channel type (or set of two or more channel types and/or grants within particular channel types) is received.

As yet another example, the sticky uplink beam configuration information may indicate to utilize a sticky uplink beam assignment 1022 that applies a last received beam ID (e.g., the first beam ID) to PUSCH signals scheduled with a reduced size DCI. In other examples, the sticky uplink beam configuration information indicating the sticky uplink beam assignment 1022 may be included in the DCI carrying the scheduling information for a new dynamic PUSCH or new CG. For example, the beam manager circuitry 1046 may be configured to instruct the communication and processing circuitry 1044 to generate and transmit DCI including an indication to utilize the first uplink beam for transmission of the new dynamic PUSCH or new CG signal. In some examples, the indication may include an SRI codepoint indicating to use a last uplink beam (e.g., the first uplink beam) previously utilized by the UE for a transmission (e.g., the first uplink signal) to the base station. In other examples, the indication may include an SRI codepoint of the first uplink beam. The beam manager circuitry 1046 may further be configured to execute beam manager software 1056 stored in the computer-readable medium 1006 to implement one or more of the functions described herein.

Figure 11:
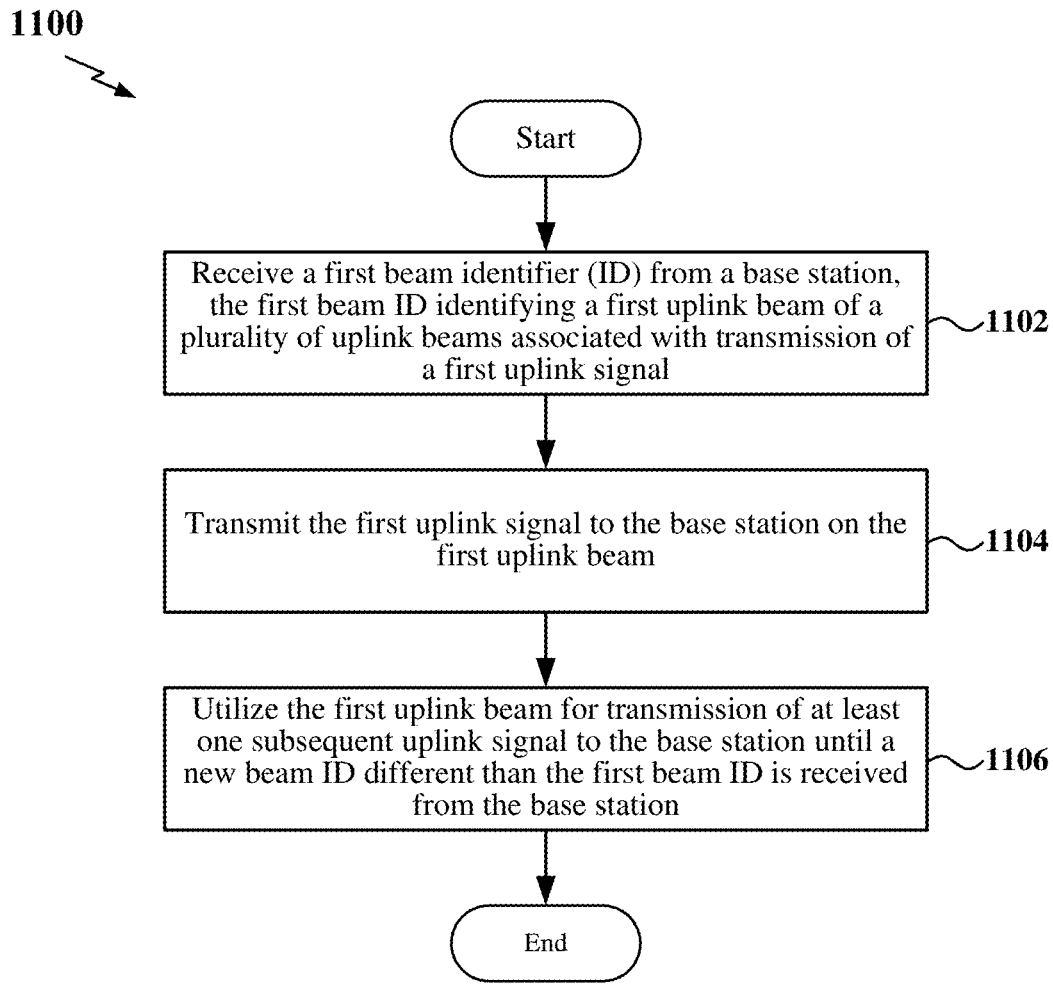
FIG. 11 is a flow chart of an exemplary method for a UE to utilize a sticky uplink beam assignment according to some aspects.

FIG. 11 is a flow chart 1100 illustrating an example of a method for a UE to utilize a sticky uplink beam assignment according to some aspects. As described below, some or all illustrated features may be omitted in a particular implementation within the scope of the present disclosure, and some illustrated features may not be required for implementation of all aspects. In some examples, the method may be performed by the UE 900, as described above and illustrated in FIG. 9, by a processor or processing system, or by any suitable means for carrying out the described functions.

At block 1102, the UE may receive a first beam identifier (ID) from a base station. The first beam ID may identify a first uplink beam of a plurality of uplink beams associated with transmission of a first uplink signal. In some examples, each of the plurality of uplink beams is identified by a respective beam ID of a plurality of beam IDs and the plurality of beam IDs each include at least one of a sounding reference signal (SRS) resource indicator (SRI) or an uplink spatial relation indicator. For example, the first beam ID may be an SRI received within control information (e.g., DCI) scheduling a data channel (e.g., a PUSCH, such as a dynamic PUSCH or CG). As another example, the first beam ID may be an uplink spatial relation indicator received within a MAC-CE activating a control channel (e.g., a PUCCH resource). For example, the communication and processing circuitry 942, together with the transceiver 910 and antenna array 930, shown and described above in connection to FIG. 9, may receive the first beam ID.

At block 1104, the UE may transmit the first uplink signal to the base station on the first uplink beam. For example, the first uplink signal may be a dynamic PUSCH or configured PUSCH scheduled by the DCI carrying the first beam ID (e.g., the SRI of the first uplink beam), or a PUCCH on a PUCCH resource activated by the MAC-CE carrying the first beam ID (e.g., the uplink spatial relation indicator). In some examples, the UE may apply a timer between receiving the first beam ID and transmitting the first uplink signal to allow for a beam switch. For example, the communication and processing circuitry 942, together with the beam manager circuitry 944, transceiver 910, and antenna array 930, shown and described above in connection with FIG. 9, may transmit the first uplink signal to the base station.

At block 1106, the UE may utilize the first uplink beam for transmission of at least one subsequent uplink signal to the base station until a new beam ID different than the first beam ID is received from the base station. In some examples, the UE may ignore the timer for the at least one subsequent uplink signal. In some examples, the UE may further receive sticky uplink beam configuration information from the base station. The sticky uplink beam configuration information may indicate to utilize the first uplink beam for the at least one subsequent uplink signal. For example, the sticky uplink beam configuration information may indicate a sticky uplink beam assignment associated with the first uplink beam. In some examples, the sticky uplink beam assignment may indicate to apply the first uplink beam to all uplink channel types (e.g., dynamic PUSCH, CG, PUCCH, etc.) or to one or more uplink channel types or grants within a particular uplink channel type.

In some examples, the first uplink signal and the at least one subsequent uplink signal each correspond to a first uplink channel type of a plurality of uplink channel types. In this example, the UE may further receive a second beam ID identifying a second uplink beam of the plurality of uplink beams associated with transmission of a second uplink signal corresponding to a second uplink channel type of the plurality of uplink channel types. The UE may then transmit the second uplink signal to the base station on the second beam and utilize the second uplink beam for transmission of at least one additional uplink signal of the second channel type until an additional beam ID different from the second beam ID and associated with the second uplink channel type is received from the base station. In some examples, the plurality of uplink channel types includes at least a dynamic PUSCH type, a CG type, and a PUCCH type.

In some examples, the UE may utilize a respective selected uplink beam of the plurality of uplink beams for each of the plurality of uplink channel types. For example, the respective selected uplink beam may be determined based on respective sticky uplink beam assignments for the uplink beams. In some examples, the respective selected uplink beam for each of the plurality of uplink channel types is different. In some examples, the CG type may include a first CG and a second CG. In this example, the UE may utilize the first uplink beam for the first CG and at least one other CG or other channel type of the plurality of uplink channel types until the new beam ID is received. The UE may further utilize a second uplink beam of the plurality of uplink beams for the second CG. In some examples, the PUCCH type includes a first PUCCH resource and a second PUCCH resource. In this example, the UE may utilize the first uplink beam for the first PUCCH resource and at least one other PUCCH resource or other channel type of the plurality of uplink channel types until the new beam ID is received. The UE may further utilize a second uplink beam of the plurality of uplink beams for the second PUCCH resource.

In some examples, the UE may further receive control information scheduling transmission of a second uplink signal. The control information may include an indication to utilize the first uplink beam of the plurality of uplink beams for transmission of the second uplink signal to the base station. In some examples, the indication may include an SRI codepoint indicating to utilize a last uplink beam (e.g., the first uplink beam) previously utilized for transmission to the base station. In some examples, the indication may include an SRI codepoint of the first uplink beam. For example, the communication and processing circuitry 942, together with the beam manager circuitry 944, transceiver 910, and antenna array 930, shown and described above in connection with FIG. 9, may utilize the first uplink beam for transmission of at least one subsequent uplink signal to the base station until the new beam ID is received from the base station.

In one configuration, the UE 900 includes means for performing the various functions and processes described in relation to FIG. 11. In one aspect, the aforementioned means may be the processor 904 shown in FIG. 9 configured to perform the functions recited by the aforementioned means. In another aspect, the aforementioned means may be a circuit or any apparatus configured to perform the functions recited by the aforementioned means.

Of course, in the above examples, the circuitry included in the processor 904 is merely provided as an example, and other means for carrying out the described functions may be included within various aspects of the present disclosure, including but not limited to the instructions stored in the computer-readable storage medium 906, or any other suitable apparatus or means described in any one of the FIGS. 1, 2, and/or 4-6, and utilizing, for example, the processes and/or algorithms described herein in relation to FIG. 11.

Figure 12:
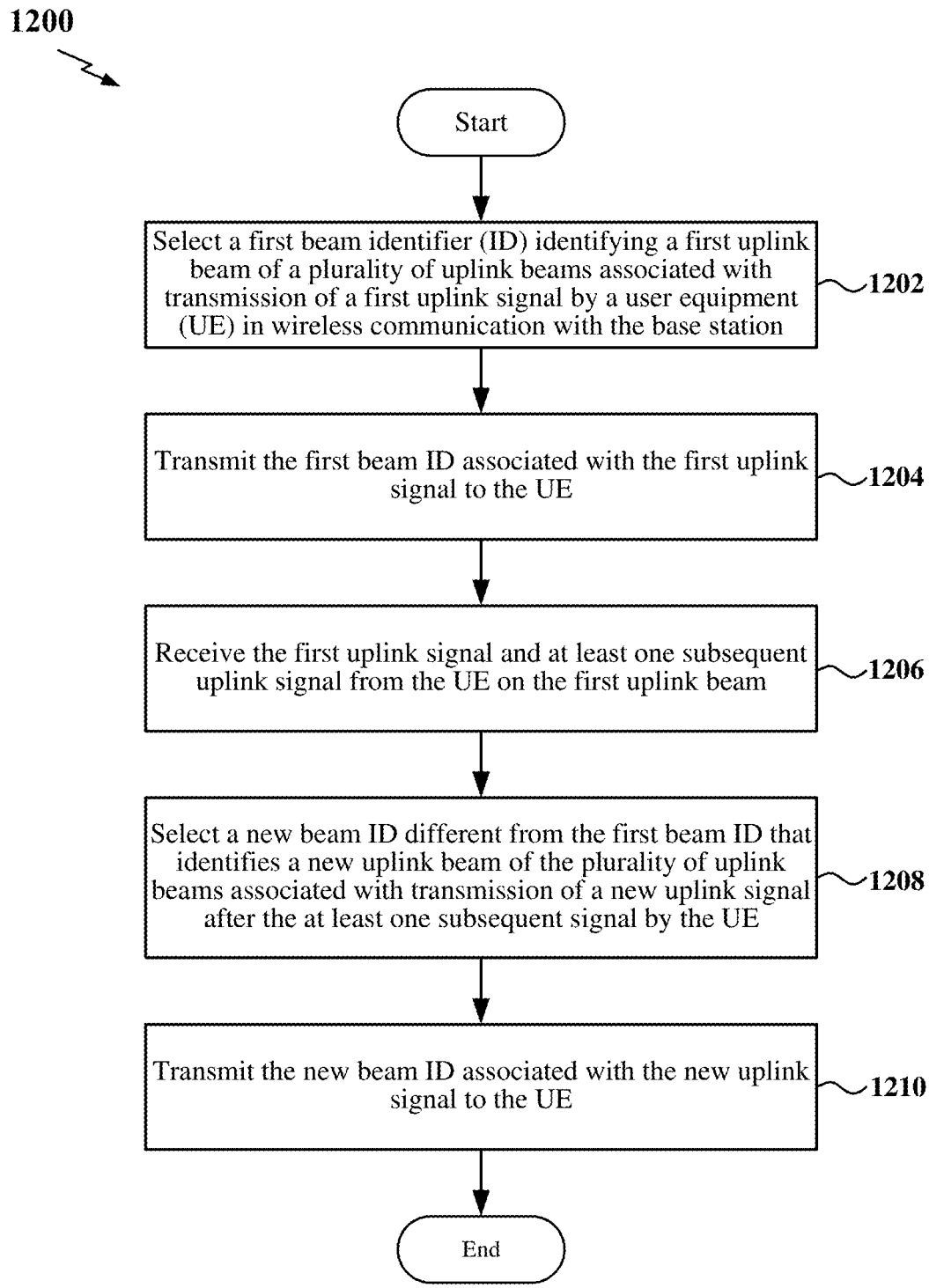
FIG. 12 is a flow chart of an exemplary method for a base station to utilize a sticky uplink beam assignment according to some aspects.

FIG. 12 is a flow chart 1200 illustrating an example of a method for a base station to utilize a sticky uplink beam assignment according to some aspects. As described below, some or all illustrated features may be omitted in a particular implementation within the scope of the present disclosure, and some illustrated features may not be required for implementation of all aspects. In some examples, the method may be performed by the base station 1000 (e.g., a gNB), as described above and illustrated in FIG. 10, by a processor or processing system, or by any suitable means for carrying out the described functions.

At block 1202, the base station may select a first beam identifier (ID) identifying a first uplink beam of a plurality of uplink beams associated with transmission of a first uplink signal by a user equipment (UE) in wireless communication with the base station. In some examples, each of the plurality of uplink beams is identified by a respective beam ID of a plurality of beam IDs and the plurality of beam IDs each include at least one of a sounding reference signal (SRS) resource indicator (SRI) or an uplink spatial relation indicator. For example, the beam manager circuitry 1046, shown and described above in connection with FIG. 10, may select the first beam ID for the first uplink signal.

At block 1204, the base station may transmit the first beam ID associated with the first uplink signal to the UE. For example, the first beam ID may be an SRI transmitted within control information (e.g., DCI) scheduling a data channel (e.g., a PUSCH, such as a dynamic PUSCH or CG). As another example, the first beam ID may be an uplink spatial relation indicator transmitted within a MAC-CE activating a control channel (e.g., a PUCCH resource). For example, the communication and processing circuitry 1044, together with the transceiver 1010 and antenna array 1030, shown and described above in connection to FIG. 10, may transmit the first beam ID.

At block 1206, the base station may receive the first uplink signal and at least one subsequent uplink signal from the UE on the first uplink beam. For example, the first uplink signal may be a dynamic PUSCH or configured PUSCH scheduled by the DCI carrying the first beam ID (e.g., the SRI of the first uplink beam), or a PUCCH on a PUCCH resource activated by the MAC-CE carrying the first beam ID (e.g., the uplink spatial relation indicator). In some examples, the base station may further transmit sticky uplink beam configuration information to the UE. The sticky uplink beam configuration information may indicate to utilize the first uplink beam for the at least one subsequent uplink signal. For example, the sticky uplink beam configuration information may indicate a sticky uplink beam assignment associated with the first uplink beam. In some examples, the sticky uplink beam assignment may indicate to apply the first uplink beam to all uplink channel types (e.g., dynamic PUSCH, CG, PUCCH, etc.) or to one or more uplink channel types or grants within a particular uplink channel type.

In some examples, the first uplink signal and the at least one subsequent uplink signal each correspond to a first uplink channel type of a plurality of uplink channel types. In this example, the base station may further transmit a second beam ID identifying a second uplink beam of the plurality of uplink beams associated with transmission of a second uplink signal corresponding to a second uplink channel type of the plurality of uplink channel types. The base station may then receive the second uplink signal and at least one additional uplink signal of the second channel type from the UE on the second uplink beam. In some examples, the plurality of uplink channel types includes at least a dynamic PUSCH type, a CG type, and a PUCCH type.

In some examples, the base station may select a respective selected uplink beam of the plurality of uplink beams for each of the plurality of uplink channel types. For example, the base station may define respective sticky uplink beam assignments for the respective selected uplink beams. In some examples, the respective selected uplink beam for each of the plurality of uplink channel types is different. In some examples, the CG type may include a first CG and a second CG. In this example, the base station may select the first uplink beam for the first CG and at least one other CG or other channel type of the plurality of uplink channel types. The base station may further select a second uplink beam of the plurality of uplink beams for the second CG. In some examples, the PUCCH type includes a first PUCCH resource and a second PUCCH resource. In this example, the base station may select the first uplink beam for the first PUCCH resource and at least one other PUCCH resource or other channel type of the plurality of uplink channel types. The base station may further select a second uplink beam of the plurality of uplink beams for the second PUCCH resource.

In some examples, the base station may further transmit control information scheduling transmission of a second uplink signal. The control information may include an indication to utilize the first uplink beam of the plurality of uplink beams for transmission of the second uplink signal to the base station. In some examples, the indication may include an SRI codepoint indicating to utilize a last uplink beam (e.g., the first uplink beam) previously utilized for transmission to the base station. In some examples, the indication may include an SRI codepoint of the first uplink beam. For example, the communication and processing circuitry 1044, together with the beam manager circuitry 1046, transceiver 1010, and antenna array 1030, shown and described above in connection with FIG. 10, may receive the first uplink signal and at least one subsequent uplink signal from the UE on the first uplink beam.

At block 1208, the base station may select a new beam ID different from the first beam ID that identifies a new uplink beam of the plurality of uplink beams associated with transmission of a new uplink signal after the at least one subsequent signal by the UE. For example, the base station may define a new sticky uplink beam assignment associated with the second uplink beam. The new sticky uplink beam assignment may indicate to apply the second uplink beam to all uplink channel types (e.g., dynamic PUSCH, CG, PUCCH, etc.) or to one or more uplink channel types or grants within a particular uplink channel type. For example, the beam manager circuitry 1046, shown and described above in connection with FIG. 10, may select the new beam ID.

At block 1210, the base station may transmit the new beam ID associated with the new uplink signal to the UE. For example, the new beam ID may be an SRI transmitted within control information (e.g., DCI) scheduling a data channel (e.g., a PUSCH, such as a dynamic PUSCH or CG). As another example, the new beam ID may be an uplink spatial relation indicator transmitted within a MAC-CE activating a control channel (e.g., a PUCCH resource). For example, the communication and processing circuitry 1044, together with the transceiver 1010 and antenna array 1030, shown and described above in connection to FIG. 10, may transmit the new beam ID.

In one configuration, the base station 1000 includes means for performing the various functions and processes described in relation to FIG. 12. In one aspect, the aforementioned means may be the processor 1004 shown in FIG. 10 configured to perform the functions recited by the aforementioned means. In another aspect, the aforementioned means may be a circuit or any apparatus configured to perform the functions recited by the aforementioned means.

Of course, in the above examples, the circuitry included in the processor 1004 is merely provided as an example, and other means for carrying out the described functions may be included within various aspects of the present disclosure, including but not limited to the instructions stored in the computer-readable storage medium 1006, or any other suitable apparatus or means described in any one of the FIGS. 1, 2, and/or 4-6, and utilizing, for example, the processes and/or algorithms described herein in relation to FIG. 12.

Figure 13:
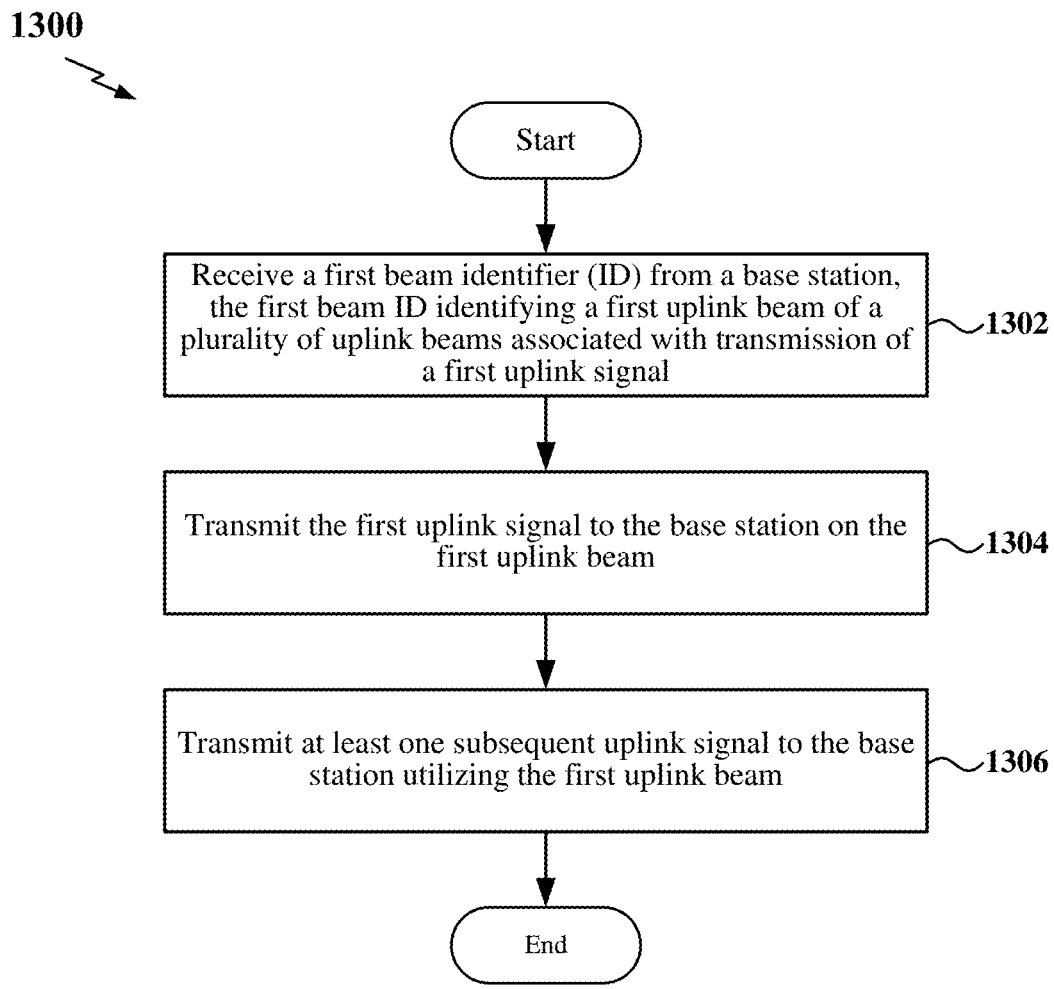
FIG. 13 is a flow chart of another exemplary method for a UE to utilize a sticky uplink beam assignment according to some aspects.

FIG. 13 is a flow chart 1300 illustrating another example of a method for a UE to utilize a sticky uplink beam assignment according to some aspects. As described below, some or all illustrated features may be omitted in a particular implementation within the scope of the present disclosure, and some illustrated features may not be required for implementation of all aspects. In some examples, the method may be performed by the UE 900, as described above and illustrated in FIG. 9, by a processor or processing system, or by any suitable means for carrying out the described functions.

At block 1302, the UE may receive a first beam identifier (ID) from a base station. The first beam ID may identify a first uplink beam of a plurality of uplink beams associated with transmission of a first uplink signal. For example, the communication and processing circuitry 942, together with the transceiver 910 and antenna array 930, shown and described above in connection to FIG. 9, may receive the first beam ID.

At block 1304, the UE may transmit the first uplink signal to the base station on the first uplink beam. In some examples, the UE may apply a timer between receiving the first beam ID and transmitting the first uplink signal to allow for a beam switch. For example, the communication and processing circuitry 942, together with the beam manager circuitry 944, transceiver 910, and antenna array 930, shown and described above in connection with FIG. 9, may transmit the first uplink signal to the base station.

At block 1306, the UE may transmit at least one subsequent uplink signal to the base station utilizing the first uplink beam. For example, the UE may transmit the first uplink signal and the at least one subsequent uplink signal on the same first uplink beam without receiving a separate beam ID for each of the at least one subsequent uplink signal. In some examples, the UE may ignore the timer for the at least one subsequent uplink signal. In some examples, the UE may further receive uplink beam configuration information from the base station. The uplink beam configuration information may indicate an uplink beam assignment for the first uplink beam and may further indicate to apply the first uplink beam to the at least one subsequent uplink signal. In some examples, the UE may further receive from the base station a new beam ID identifying a new uplink beam of the plurality of uplink beams, wherein the new uplink beam is associated with transmission of a new uplink signal after the at least one subsequent uplink signal. The new beam ID may be different from the first beam ID.

In some examples, the first uplink signal and the at least one subsequent uplink signal each correspond to a first uplink channel type of a plurality of uplink channel types. In this example, the UE may further receive a second beam ID identifying a second uplink beam of the plurality of uplink beams associated with transmission of a second uplink signal corresponding to a second uplink channel type of the plurality of uplink channel types. The UE may then transmit the second uplink signal to the base station on the second beam and transmit at least one additional uplink signal of the second channel type utilizing the second uplink beam.

In some examples, the UE may utilize a respective selected uplink beam of the plurality of uplink beams for each of the plurality of uplink channel types. In some examples, the respective selected uplink beam for each of the plurality of uplink channel types is different. In some examples, the plurality of uplink channel types includes a configured grant (CG) type. The CG type may include a first CG and a second CG. In this example, the UE may utilize a respective CG uplink beam of the plurality of uplink beams for each of the first configured grant and the second configured grant. In some examples, the plurality of uplink channel types includes a physical uplink control channel (PUCCH) type. The PUCCH type may include a first PUCCH resource and a second PUCCH resource. In this example, the UE may utilize a respective PUCCH resource uplink beam of the plurality of uplink beams for each of the first PUCCH resource and the second PUCCH resource.

In some examples, the UE may further receive control information scheduling transmission of a second uplink signal. The control information may include an indication to utilize the first uplink beam of the plurality of uplink beams for transmission of the second uplink signal to the base station. In some examples, the indication may include an SRI codepoint indicating to utilize a last uplink beam (e.g., the first uplink beam) previously utilized for transmission to the base station. In some examples, the indication may include an SRI codepoint of the first uplink beam. For example, the communication and processing circuitry 942, together with the beam manager circuitry 944, transceiver 910, and antenna array 930, shown and described above in connection with FIG. 9, may utilize the first uplink beam for transmission of at least one subsequent uplink signal to the base station until the new beam ID is received from the base station.

In one configuration, the UE 900 includes means for performing the various functions and processes described in relation to FIG. 13. In one aspect, the aforementioned means may be the processor 904 shown in FIG. 9 configured to perform the functions recited by the aforementioned means. In another aspect, the aforementioned means may be a circuit or any apparatus configured to perform the functions recited by the aforementioned means.

Of course, in the above examples, the circuitry included in the processor 904 is merely provided as an example, and other means for carrying out the described functions may be included within various aspects of the present disclosure, including but not limited to the instructions stored in the computer-readable storage medium 906, or any other suitable apparatus or means described in any one of the FIGS. 1, 2, and/or 4-6, and utilizing, for example, the processes and/or algorithms described herein in relation to FIG. 11 or 13.

Figure 14:
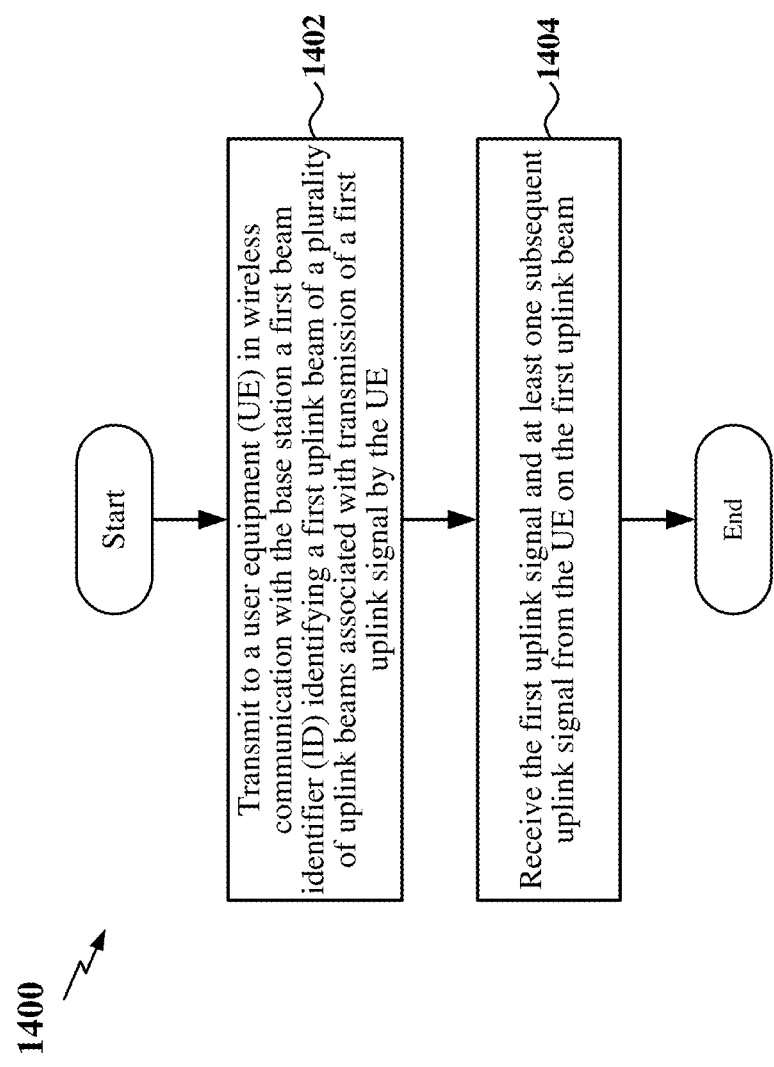
FIG. 14 is a flow chart of another exemplary method for a base station to utilize a sticky uplink beam assignment according to some aspects.

FIG. 14 is a flow chart 1400 illustrating another example of a method for a base station to utilize a sticky uplink beam assignment according to some aspects. As described below, some or all illustrated features may be omitted in a particular implementation within the scope of the present disclosure, and some illustrated features may not be required for implementation of all aspects. In some examples, the method may be performed by the base station 1000 (e.g., a gNB), as described above and illustrated in FIG. 10, by a processor or processing system, or by any suitable means for carrying out the described functions.

At block 1402, the base station may transmit to a user equipment (UE) in wireless communication with the base station a first beam identifier (ID) identifying a first uplink beam of a plurality of uplink beams associated with transmission of a first uplink signal by the UE. For example, the communication and processing circuitry 1044, together with the transceiver 1010 and antenna array 1030, shown and described above in connection to FIG. 10, may transmit the first beam ID.

At block 1404, the base station may receive the first uplink signal and at least one subsequent uplink signal from the UE on the first uplink beam. For example, the base station may receive the first uplink signal and the at least one subsequent uplink signal on the same first uplink beam without transmitting a separate beam ID for each of the at least one subsequent uplink signal. In some examples, the base station may further transmit uplink beam configuration information to the UE. The uplink beam configuration information may indicate an uplink beam assignment. The uplink beam assignment may indicate to apply the first uplink beam to the at least one subsequent uplink signal. In some examples, the base station may further transmit to the UE a new beam ID identifying a new uplink beam of the plurality of uplink beams associated with transmission of a new uplink signal after the at least one subsequent signal. The new beam ID may be different from the first beam ID.

In some examples, the first uplink signal and the at least one subsequent uplink signal each correspond to a first uplink channel type of a plurality of uplink channel types. In this example, the base station may further transmit a second beam ID identifying a second uplink beam of the plurality of uplink beams associated with transmission of a second uplink signal corresponding to a second uplink channel type of the plurality of uplink channel types. The base station may then receive the second uplink signal and at least one additional uplink signal of the second channel type from the UE on the second uplink beam. In some examples, the base station may further transmit an additional beam ID associated with the second uplink channel type to the UE after receiving the second uplink signal and the at least one additional uplink signal. The additional beam ID may be different from the second beam ID.

In some examples, the base station may select a respective selected uplink beam of the plurality of uplink beams for each of the plurality of uplink channel types. In some examples, the respective selected uplink beam for each of the plurality of uplink channel types is different. In some examples, the plurality of uplink channel types includes a configured grant (CG) type. The CG type may include a first CG and a second CG. In this example, the base station may select the first uplink beam for the first CG. The base station may further select a second uplink beam of the plurality of uplink beams for the second CG. In some examples, the plurality of uplink channel types includes a physical uplink control channel (PUCCH) type. The PUCCH type may include a first PUCCH resource and a second PUCCH resource. In this example, the base station may select the first uplink beam for the first PUCCH resource. The base station may further select a second uplink beam of the plurality of uplink beams for the second PUCCH resource.

In some examples, the base station may further transmit control information scheduling transmission of a second uplink signal. The control information may include an indication to utilize the first uplink beam of the plurality of uplink beams for transmission of the second uplink signal to the base station. In some examples, the indication may include an SRI codepoint indicating to utilize a last uplink beam (e.g., the first uplink beam) previously utilized for transmission to the base station. In some examples, the indication may include an SRI codepoint of the first uplink beam. In some examples, the control information may have a reduced size that excludes an SRI codepoint. For example, the communication and processing circuitry 1044, together with the beam manager circuitry 1046, transceiver 1010, and antenna array 1030, shown and described above in connection with FIG. 10, may receive the first uplink signal and at least one subsequent uplink signal from the UE on the first uplink beam.

In one configuration, the base station 1000 includes means for performing the various functions and processes described in relation to FIG. 14. In one aspect, the aforementioned means may be the processor 1004 shown in FIG. 10 configured to perform the functions recited by the aforementioned means. In another aspect, the aforementioned means may be a circuit or any apparatus configured to perform the functions recited by the aforementioned means.

Of course, in the above examples, the circuitry included in the processor 1004 is merely provided as an example, and other means for carrying out the described functions may be included within various aspects of the present disclosure, including but not limited to the instructions stored in the computer-readable storage medium 1006, or any other suitable apparatus or means described in any one of the FIGS. 1, 2, and/or 4-6, and utilizing, for example, the processes and/or algorithms described herein in relation to FIG. 12 and/or 14.

The following provides an overview of examples of the present disclosure.

Example 1: A method for wireless communication at a user equipment (UE) in a wireless communication network, the method comprising: receiving a first beam identifier (ID) from a base station, the first beam ID identifying a first uplink beam of a plurality of uplink beams associated with transmission of a first uplink signal; transmitting the first uplink signal to the base station on the first uplink beam; and utilizing the first uplink beam for transmission of at least one subsequent uplink signal to the base station until a new beam ID is received from the base station, wherein the new beam ID is different from the first beam ID.

Example 2: The method of example 1, wherein the first uplink signal and the at least one subsequent uplink signal each correspond to a first uplink channel type of a plurality of uplink channel types.

Example 3: The method of example 1 or 2 further comprising: receiving a second beam ID from the base station, the second beam ID identifying a second uplink beam of the plurality of uplink beams associated with transmission of a second uplink signal corresponding to a second uplink channel type of the plurality of uplink channel types; transmitting the second uplink signal to the base station on the second uplink beam; and utilizing the second uplink beam for transmission of at least one additional uplink signal of the second uplink channel type to the base station until an additional beam ID associated with the second uplink channel type is received from the base station, wherein the additional beam ID is different from the second beam ID.

Example 4: The method of any one of examples 1 through 3, wherein the plurality of uplink channel types comprise at least a dynamic physical uplink shared channel (PUSCH) type, a configured grant type, and a physical uplink control channel (PUCCH) type.

Example 5: The method of any one of examples 1 through 4, further comprising: utilizing a respective selected uplink beam of the plurality of uplink beams for each of the plurality of uplink channel types.

Example 6: The method of any one of examples 1 through 5, wherein the respective selected uplink beam for each of the plurality of uplink channel types is different.

Example 7: The method of any one of examples 1 through 6, wherein the configured grant type comprises a first configured grant and a second configured grant, and further comprising: utilizing a respective selected uplink beam of the plurality of uplink beams for each of the first configured grant and the second configured grant.

Example 8: The method of any one of examples 1 through 7, wherein the PUCCH type comprises a first PUCCH resource and a second PUCCH resource, and further comprising: utilizing a respective selected uplink beam of the plurality of uplink beams for each of the first PUCCH resource and the second PUCCH resource.

Example 9: The method of any one of examples 1 through 8, further comprising: receiving control information scheduling transmission of a second uplink signal, wherein the control information comprises an indication to utilize the first uplink beam of the plurality of uplink beams for transmission of the second uplink signal to the base station.

Example 10: The method of any one of claims 1 through 9, wherein the indication comprises a sounding reference signal (SRS) resource indicator (SRI) codepoint indicating to utilize a last uplink beam previously utilized for transmission to the base station, wherein the last uplink beam is the first uplink beam.

Example 11: The method of any one of claims 1 through 10, wherein the indication comprises a sounding reference signal (SRS) resource indicator (SRI) codepoint of the first uplink beam.

Example 12: The method of any one of claims 1 through 11, wherein each of the plurality of uplink beams is identified by a respective beam ID of a plurality of beam IDs and the plurality of beam IDs each comprise at least one of a sounding reference signal (SRS) resource indicator (SRI) or an uplink spatial relation indicator.

Example 13: The method of any one of claims 1 through 12, further comprising:
applying a timer between the receiving the first beam ID and the transmitting the first uplink signal; and ignoring the timer for the at least one subsequent uplink signal.

Example 14: The method of any one of claims 1 through 13, further comprising: receiving sticky uplink beam configuration information from the base station, wherein the sticky uplink beam configuration information indicates a sticky uplink beam assignment for the first uplink beam, wherein the sticky uplink beam assignment indicates to apply the first uplink beam to the at least one subsequent uplink signal.

Example 15: A method for wireless communication at a base station in a wireless communication network, the method comprising: selecting a first beam identifier (ID) identifying a first uplink beam of a plurality of uplink beams associated with transmission of a first uplink signal by a user equipment (UE) in wireless communication with the base station; transmitting the first beam ID associated with the first uplink signal to the UE; receiving the first uplink signal and at least one subsequent uplink signal from the UE on the first uplink beam; selecting a new beam ID identifying a new uplink beam of the plurality of uplink beams associated with transmission of a new uplink signal after the at least one subsequent signal by the UE, wherein the new beam ID is different from the first beam ID; and transmitting the new beam ID associated with the new uplink signal to the UE.

Example 16: The method of claim 15, wherein the first uplink signal and the at least one subsequent uplink signal each correspond to a first uplink channel type of a plurality of uplink channel types.

Example 17: The method of claim 15 or 16, further comprising: transmitting a second beam ID to the UE, the second beam ID identifying a second uplink beam of the plurality of uplink beams associated with transmission of a second uplink signal corresponding to a second uplink channel type of the plurality of uplink channel types; receiving the second uplink signal and at least one additional uplink signal of the second uplink channel type from the UE on the second uplink beam; and transmitting an additional beam ID associated with the second uplink channel type to the UE after the receiving the second uplink signal and the at least one additional uplink signal, wherein the additional beam ID is different from the second beam ID.

Example 18: The method of any one of claims 15 through 17, wherein the plurality of uplink channel types comprise at least a dynamic physical uplink shared channel (PUSCH) type, a configured grant type, and a physical uplink control channel (PUCCH) type.

Example 19: The method of any one of claims 15 through 18, further comprising: selecting a respective selected uplink beam of the plurality of uplink beams for each of the plurality of uplink channel types.

Example 20: The method of any one of claims 15 through 19, wherein the respective selected uplink beam for each of the plurality of uplink channel types is different.

Example 21: The method of any one of claims 15 through 20, wherein the configured grant type comprises a first configured grant and a second configured grant, and further comprising: selecting the first uplink beam and the new uplink beam for the first configured grant and at least one other configured grant or other channel type of the plurality of uplink channel types; and selecting a second uplink beam of the plurality of uplink beams for the second configured grant.

Example 22: The method of any one of claims 15 through 21, wherein the PUCCH type comprises a first PUCCH resource and a second PUCCH resource, and further comprising: selecting the first uplink beam and the new uplink beam for the first PUCCH resource and at least one other PUCCH resource or other channel type of the plurality of uplink channel types; and selecting a second uplink beam of the plurality of uplink beams for the second PUCCH resource.

Example 23: The method of any one of claims 15 through 22, further comprising: transmitting control information scheduling transmission of a second uplink signal, wherein the control information indicates to utilize the first uplink beam of the plurality of uplink beams for transmission of the second uplink signal to the base station.

Example 24: The method of any one of claims 15 through 23, wherein the control information comprises a sounding reference signal (SRS) resource indicator (SRI) codepoint indicating to utilize a last uplink beam previously utilized for transmission to the base station, wherein the last uplink beam is the first uplink beam.

Example 25: The method of any one of claims 15 through 24, wherein the control information comprises a sounding reference signal (SRS) resource indicator (SRI) codepoint of the first uplink beam.

Example 26: The method of any one of claims 15 through 25, wherein the control information has a reduced size that excludes a sounding reference signal (SRS) resource indicator (SRI) codepoint.

Example 27: The method of any one of claims 15 through 26, wherein each of the plurality of uplink beams is identified by a respective beam ID of a plurality of beam IDs and the plurality of beam IDs each comprise at least one of a sounding reference signal (SRS) resource indicator (SRI) or an uplink spatial relation indicator.

Example 28: The method of any one of claims 15 through 27, further comprising: transmitting sticky uplink beam configuration information to the UE, wherein the sticky uplink beam configuration information indicates a sticky uplink beam assignment, wherein the sticky uplink beam assignment indicates to apply the first uplink beam to the at least one subsequent uplink signal.

Example 29: An apparatus for wireless communication comprising a processor, a memory coupled to the processor, the processor and memory configured to perform a method of any one of examples 1 through 28.

Example 30: An apparatus for wireless communication comprising at least one means for performing a method of any one of examples 1 through 28.

Example 31: A non-transitory computer-readable medium storing computer-executable code, comprising code for causing an apparatus to perform a method of any one of examples 1 through 28.

Example 32: A method for wireless communication at a user equipment (UE) in a wireless communication network, the method comprising: receiving a first beam identifier (ID) from a base station, the first beam ID identifying a first uplink beam of a plurality of uplink beams associated with transmission of a first uplink signal; transmitting the first uplink signal to the base station on the first uplink beam; and transmitting at least one subsequent uplink signal to the base station utilizing the first uplink beam.

Example 33: The method of example 32, further comprising: receiving from the base station a new beam ID identifying a new uplink beam of the plurality of uplink beams, wherein the new uplink beam is associated with transmission of a new uplink signal after the at least one subsequent uplink signal, wherein the new beam ID is different from the first beam ID.

Example 34: The method of example 32 or 33, wherein the first uplink signal and the at least one subsequent uplink signal each correspond to a first uplink channel type of a plurality of uplink channel types.

Example 35: The method of example 34, further comprising: receiving a second beam ID from the base station, the second beam ID identifying a second uplink beam of the plurality of uplink beams associated with transmission of a second uplink signal corresponding to a second uplink channel type of the plurality of uplink channel types; transmitting the second uplink signal to the base station on the second uplink beam; and transmitting at least one additional uplink signal of the second uplink channel type to the base station utilizing the second uplink beam.

Example 36: The method of example 34 or 35, further comprising: utilizing a respective selected uplink beam of the plurality of uplink beams for each of the plurality of uplink channel types.

Example 37: The method of example 36, wherein the respective selected uplink beam for each of the plurality of uplink channel types is different.

Example 38: The method of any of examples 34 through 37, wherein the plurality of uplink channel types comprises a configured grant type, wherein the configured grant type comprises a first configured grant and a second configured grant, and further comprising: utilizing a respective configured grant uplink beam of the plurality of uplink beams for each of the first configured grant and the second configured grant.

Example 39: The method of any of examples 34 through 37, wherein the plurality of uplink channel types comprises a physical uplink control channel (PUCCH) type, wherein the PUCCH type comprises a first PUCCH resource and a second PUCCH resource, and further comprising: utilizing a respective PUCCH resource uplink beam of the plurality of uplink beams for each of the first PUCCH resource and the second PUCCH resource.

Example 40: The method of any of examples 32 through 39, further comprising: receiving control information scheduling transmission of a second uplink signal, wherein the control information comprises an indication to utilize the first uplink beam of the plurality of uplink beams for transmission of the second uplink signal to the base station.

Example 41: The method of example 40, wherein the indication comprises a sounding reference signal (SRS) resource indicator (SRI) codepoint indicating to utilize a last uplink beam previously utilized for transmission to the base station, wherein the last uplink beam is the first uplink beam.

Example 42: The method of example 40, wherein the indication comprises a sounding reference signal (SRS) resource indicator (SRI) codepoint of the first uplink beam.

Example 43: The method of any of examples 32 through 42, further comprising: applying a timer between the receiving the first beam ID and the transmitting the first uplink signal; and ignoring the timer for the at least one subsequent uplink signal.

Example 44: The method of any of examples 32 through 43, further comprising: receiving uplink beam configuration information from the base station, wherein the uplink beam configuration information indicates a uplink beam assignment for the first uplink beam, wherein the uplink beam assignment indicates to apply the first uplink beam to the at least one subsequent uplink signal.

Example 45: A user equipment (UE) configured for wireless communication in a wireless communication network, comprising: a processor; and a memory coupled to the processor, the processor and the memory configured to perform a method of any one of examples 32 through 44.

Example 46: A user equipment (UE) configured for wireless communication comprising at least one means for performing a method of any one of examples 32 through 44.

Example 47: A non-transitory computer-readable medium having stored therein instructions executable by one or more processors of a user equipment (UE) to perform a method of any one of examples 32 through 44.

Example 48: A method for wireless communication at a base station in a wireless communication network, the method comprising: transmitting to a user equipment (UE) in wireless communication with the base station a first beam identifier (ID) identifying a first uplink beam of a plurality of uplink beams associated with transmission of a first uplink signal by the UE; and receiving the first uplink signal and at least one subsequent uplink signal from the UE on the first uplink beam.

Example 49: The method of example 48, further comprising: transmitting to the UE a new beam ID identifying a new uplink beam of the plurality of uplink beams associated with transmission of a new uplink signal after the at least one subsequent uplink signal by the UE, wherein the new beam ID is different from the first beam ID.

Example 50: The method of example 48 or 49, wherein the first uplink signal and the at least one subsequent uplink signal each correspond to a first uplink channel type of a plurality of uplink channel types.

Example 51: The method of any of example 50, further comprising: transmitting a second beam ID to the UE, the second beam ID identifying a second uplink beam of the plurality of uplink beams associated with transmission of a second uplink signal corresponding to a second uplink channel type of the plurality of uplink channel types; receiving the second uplink signal and at least one additional uplink signal of the second uplink channel type from the UE on the second uplink beam; and transmitting an additional beam ID associated with the second uplink channel type to the UE after the receiving the second uplink signal and the at least one additional uplink signal, wherein the additional beam ID is different from the second beam ID.

Example 52: The method of example 50 or 51, further comprising: selecting a respective selected uplink beam of the plurality of uplink beams for each of the plurality of uplink channel types.

Example 53: The method of example 52, wherein the respective selected uplink beam for each of the plurality of uplink channel types is different.

Example 54: The method of any of examples 50 through 53, wherein the plurality of uplink channel types comprises a configured grant type, wherein the configured grant type comprises a first configured grant and a second configured grant, and further comprising: selecting the first uplink beam for the first configured grant; and selecting a second uplink beam of the plurality of uplink beams for the second configured grant.

Example 55: The method of any of examples 50 through 53, wherein the plurality of uplink channel types comprises a physical uplink control channel (PUCCH) type, wherein the PUCCH type comprises a first PUCCH resource and a second PUCCH resource, and further comprising: selecting the first uplink beam for the first PUCCH resource; and selecting a second uplink beam of the plurality of uplink beams for the second PUCCH resource.

Example 56: The method of any of examples 48 through 55, further comprising: transmitting control information scheduling transmission of a second uplink signal, wherein the control information indicates to utilize the first uplink beam of the plurality of uplink beams for transmission of the second uplink signal to the base station.

Example 57: The method of example 56, wherein the control information comprises a sounding reference signal (SRS) resource indicator (SRI) codepoint indicating to utilize a last uplink beam previously utilized for transmission to the base station, wherein the last uplink beam is the first uplink beam.

Example 58: The method of example 56, wherein the control information comprises a sounding reference signal (SRS) resource indicator (SRI) codepoint of the first uplink beam.

Example 59: The method of example 56, wherein the control information has a reduced size that excludes a sounding reference signal (SRS) resource indicator (SRI) codepoint.

Example 60: The method of any of examples 48 through 59, further comprising: transmitting uplink beam configuration information to the UE, wherein the uplink beam configuration information indicates an uplink beam assignment, wherein the uplink beam assignment indicates to apply the first uplink beam to the at least one subsequent uplink signal.

Example 61: A base station configured for wireless communication in a wireless communication network, comprising: a processor; and a memory coupled to the processor, wherein the processor and the memory are configured to perform a method of any one of examples 48 through 60.

Example 62: A base station configured for wireless communication comprising at least one means for performing a method of any one of examples 48 through 60.

Example 63: A non-transitory computer-readable medium having stored therein instructions executable by one or more processors of a base station to perform a method of any one of examples 48 through 60.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4-6, 9, and/or 10 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus configured for wireless communication, comprising:
   one or more processors; and
   one or more memories coupled to the one or more processors, the one or more processors configured to cause the apparatus to:
   receive a first beam identifier (ID) from a network element, the first beam ID identifying a first uplink beam of a plurality of uplink beams associated with transmission of a first uplink signal;
   transmit the first uplink signal to the network element on the first uplink beam;
   transmit at least one subsequent uplink signal to the network element utilizing the first uplink beam; and
   ignore a timer, applied upon reception of the first beam ID, for the at least one subsequent uplink signal.

2. The apparatus of claim 1, wherein the one or more processors are further configured to cause the apparatus to:
   receive from the network element a new beam ID identifying a new uplink beam of the plurality of uplink beams, wherein the new uplink beam is associated with transmission of a new uplink signal after the at least one subsequent uplink signal, wherein the new beam ID is different from the first beam ID.

3. The apparatus of claim 1, wherein the first uplink signal and the at least one subsequent uplink signal each correspond to a first uplink channel type of a plurality of uplink channel types.

4. The apparatus of claim 3, wherein the one or more processors are further configured to cause the apparatus to:
   receive a second beam ID from the network element, the second beam ID identifying a second uplink beam of the plurality of uplink beams associated with transmission of a second uplink signal corresponding to a second uplink channel type of the plurality of uplink channel types;
transmit the second uplink signal to the network element on the second uplink beam; and
transmit at least one additional uplink signal of the second uplink channel type to the network element utilizing the second uplink beam.

5. The apparatus of claim 3, wherein the one or more processors are further configured to cause the apparatus to:
utilize a respective selected uplink beam of the plurality of uplink beams for each of the plurality of uplink channel types selected based on a respective beam ID received from the network element, the respective uplink beam for the first uplink channel type corresponding to the first uplink beam.

6. The apparatus of claim 5, wherein the respective selected uplink beam for each of the plurality of uplink channel types is different.

7. The apparatus of claim 3, wherein the plurality of uplink channel types other than the first uplink channel type comprises a configured grant type, wherein the configured grant type comprises a first configured grant and a second configured grant, and wherein the one or more processors are further configured to cause the apparatus to:
utilize a respective configured grant uplink beam of the plurality of uplink beams for each of the first configured grant and the second configured grant selected based on a respective beam ID received for each of the first configured grant and the second configured grant.

8. The apparatus of claim 3, wherein the plurality of uplink channel types other than the first uplink channel type comprises a physical uplink control channel (PUCCH) type, wherein the PUCCH type comprises a first PUCCH resource and a second PUCCH resource, and wherein the one or more processors are further configured to cause the apparatus to:
utilize a respective PUCCH resource uplink beam of the plurality of uplink beams for each of the first PUCCH resource and the second PUCCH resource selected based on a respective beam ID received for each of the first PUCCH resource and the second PUCCH resource.

9. The apparatus of claim 1, further comprising:
one or more transceivers coupled to the one or more processors, wherein the one or more processors are further configured to cause the apparatus to:
receive control information comprising scheduling information for a second uplink signal via the one or more transceivers, wherein the control information comprises an indication to utilize the first uplink beam of the plurality of uplink beams for transmission of the second uplink signal to the network element.

10. The apparatus of claim 9, wherein the indication comprises a sounding reference signal (SRS) resource indicator (SRI) codepoint indicating to utilize a last uplink beam previously utilized for transmission to the network element, wherein the last uplink beam is the first uplink beam.

11. The apparatus of claim 9, wherein the indication comprises a sounding reference signal (SRS) resource indicator (SRI) codepoint of the first uplink beam.

12. The apparatus of claim 1, wherein the one or more processors are further configured to cause the apparatus to:
apply the timer between reception of the first beam ID and transmission of the first uplink signal.

13. The apparatus of claim 1, wherein the one or more processors are further configured to cause the apparatus to:

receive uplink beam configuration information from the network element, wherein the uplink beam configuration information indicates an uplink beam assignment for the first uplink beam, wherein the uplink beam assignment indicates to apply the first uplink beam to the at least one subsequent uplink signal.

14. A method for wireless communication at an apparatus of a user equipment (UE), the method comprising:
receiving a first beam identifier (ID) from a network element, the first beam ID identifying a first uplink beam of a plurality of uplink beams associated with transmission of a first uplink signal;
transmitting the first uplink signal to the network element on the first uplink beam;
transmitting at least one subsequent uplink signal to the network element utilizing the first uplink beam; and
ignore a timer, applied upon reception of the first beam ID, for the at least one subsequent uplink signal.

15. The method of claim 14, further comprising:
receiving from the network element a new beam ID identifying a new uplink beam of the plurality of uplink beams, wherein the new uplink beam is associated with transmission of a new uplink signal after the at least one subsequent uplink signal, wherein the new beam ID is different from the first beam ID.

16. An apparatus configured for wireless communication, comprising:
one or more processors; and
one or more memories coupled to the one or more processors, the one or more processors configured to cause the apparatus to:
provide a first beam identifier (ID) identifying a first uplink beam of a plurality of uplink beams associated with a first uplink signal;
receive the first uplink signal and at least one subsequent uplink signal on the first uplink beam; and
provide control information comprising scheduling information for a second uplink signal of the at least one subsequent uplink signal, the control information comprising a sounding reference signal (SRS) resource indicator (SRI) codepoint indicating to utilize a last uplink beam for the second uplink signal, the last uplink beam being the first uplink beam.

17. The apparatus of claim 16, further comprising:
one or more transceivers coupled to the one or more processors, wherein the one or more processors are further configured to cause the apparatus to:
transmit a new beam ID identifying a new uplink beam of the plurality of uplink beams associated with a new uplink signal after the at least one subsequent uplink signal via the one or more transceivers, wherein the new beam ID is different from the first beam ID.

18. The apparatus of claim 16, wherein the first uplink signal and the at least one subsequent uplink signal each correspond to a first uplink channel type of a plurality of uplink channel types.

19. The apparatus of claim 18, wherein the one or more processors are further configured to cause the apparatus to:
transmit a second beam ID, the second beam ID identifying a second uplink beam of the plurality of uplink beams associated with a second uplink signal corresponding to a second uplink channel type of the plurality of uplink channel types;
receive the second uplink signal and at least one additional uplink signal of the second uplink channel type on the second uplink beam; and transmit an additional beam ID associated with the second uplink channel type after reception of the second uplink signal and the at least one additional uplink signal, wherein the additional beam ID is different from the second beam ID.

20. The apparatus of claim 18, wherein the one or more processor are further configured to cause the apparatus to:
select a respective selected uplink beam of the plurality of uplink beams for each of the plurality of uplink channel types, the respective uplink beam for the first uplink channel type corresponding to the first uplink beam.

21. The apparatus of claim 20, wherein the respective selected uplink beam for each of the plurality of uplink channel types is different.

22. The apparatus of claim 18, wherein the plurality of uplink channel types other than the first uplink channel type comprises a configured grant type, wherein the configured grant type comprises a first configured grant and a second configured grant, and wherein the one or more processors are further configured to cause the apparatus to:
select the first uplink beam for the first configured grant; and
select a second uplink beam of the plurality of uplink beams for the second configured grant.

23. The apparatus of claim 18, wherein the plurality of uplink channel types other than the first uplink channel type comprises a physical uplink control channel (PUCCH) type, wherein the PUCCH type comprises a first PUCCH resource and a second PUCCH resource, and wherein the one or more processors are further configured to cause the apparatus to:
select the first uplink beam for the first PUCCH resource; and
select a second uplink beam of the plurality of uplink beams for the second PUCCH resource.

24. The apparatus of claim 16, wherein the one or more processors are further configured to cause the apparatus to:
transmit uplink beam configuration information, wherein the uplink beam configuration information indicates an uplink beam assignment, wherein the uplink beam assignment indicates to apply the first uplink beam to the at least one subsequent uplink signal.

25. A method for wireless communication at an apparatus of a network element, the method comprising:
providing a first beam identifier (ID) identifying a first uplink beam of a plurality of uplink beams associated with transmission of a first uplink signal to the network element;
receiving the first uplink signal and at least one subsequent uplink signal on the first uplink beam; and
providing control information comprising scheduling information for a second uplink signal of the at least one subsequent uplink signal, the control information comprising a sounding reference signal (SRS) resource indicator (SRI) codepoint indicating to utilize a last uplink beam for the second uplink signal, the last uplink beam being the first uplink beam.

26. The method of claim 25, further comprising:
transmitting a new beam ID identifying a new uplink beam of the plurality of uplink beams associated with transmission of a new uplink signal after the at least one subsequent uplink signal by the UE, wherein the new beam ID is different from the first beam ID.

27. An apparatus configured for wireless communication, comprising:
one or more processors; and
one or more memories coupled to the one or more processors, the one or more processors configured to cause the apparatus to:
receive a first beam identifier (ID) from a network element, the first beam ID identifying a first uplink beam of a plurality of uplink beams associated with transmission of a first uplink signal;
transmit the first uplink signal to the network element on the first uplink beam;
transmit at least one subsequent uplink signal to the network element utilizing the first uplink beam; and
receive control information comprising scheduling information for a second uplink signal of the at least one subsequent uplink signal, the control information comprising a sounding reference signal (SRS) resource indicator (SRI) codepoint indicating to utilize a last uplink beam for the second uplink signal, the last uplink beam being the first uplink beam.

28. The apparatus of claim 27, wherein the one or more processors are further configured to cause the apparatus to:
receive from the network element a new beam ID identifying a new uplink beam of the plurality of uplink beams, wherein the new uplink beam is associated with transmission of a new uplink signal after the at least one subsequent uplink signal, wherein the new beam ID is different from the first beam ID.

29. The apparatus of claim 27, wherein the first uplink signal and the at least one subsequent uplink signal each correspond to a first uplink channel type of a plurality of uplink channel types.

30. The apparatus of claim 29, wherein the one or more processors are further configured to cause the apparatus to:
receive a second beam ID from the network element, the second beam ID identifying a second uplink beam of the plurality of uplink beams associated with transmission of a second uplink signal corresponding to a second uplink channel type of the plurality of uplink channel types;
transmit the second uplink signal to the network element on the second uplink beam; and
transmit at least one additional uplink signal of the second uplink channel type to the network element utilizing the second uplink beam.

31. The apparatus of claim 29, wherein the one or more processors are further configured to cause the apparatus to:
utilize a respective selected uplink beam of the plurality of uplink beams for each of the plurality of uplink channel types selected based on a respective beam ID received from the network element, the respective uplink beam for the first uplink channel type corresponding to the first uplink beam.

32. The apparatus of claim 31, wherein the respective selected uplink beam for each of the plurality of uplink channel types is different.

33. The apparatus of claim 27, wherein the one or more processors are further configured to cause the apparatus to:
apply a timer between the receiving the first beam ID and the transmitting the first uplink signal; and
ignore the timer for the at least one subsequent uplink signal.

34. A method for wireless communication at an apparatus of a user equipment (UE), the method comprising:
receiving a first beam identifier (ID) from a network element, the first beam ID identifying a first uplink beam of a plurality of uplink beams associated with transmission of a first uplink signal;

transmitting the first uplink signal to the network element on the first uplink beam;

transmitting at least one subsequent uplink signal to the network element utilizing the first uplink beam; and receiving control information comprising scheduling information for a second uplink signal of the at least one subsequent uplink signal, the control information comprising a sounding reference signal (SRS) resource indicator (SRI) codepoint indicating to utilize a last uplink beam for the second uplink signal, the last uplink beam being the first uplink beam.

35. The method of claim 34, further comprising:

receiving from the network element a new beam ID identifying a new uplink beam of the plurality of uplink beams, wherein the new uplink beam is associated with transmission of a new uplink signal after the at least one subsequent uplink signal, wherein the new beam ID is different from the first beam ID.

36. A non-transitory computer-readable medium having stored therein instructions executable by one or more processors of a user equipment (UE) to:

receive a first beam identifier (ID) from a network element, the first beam ID identifying a first uplink beam of a plurality of uplink beams associated with transmission of a first uplink signal;

transmit the first uplink signal to the network element on the first uplink beam;

transmit at least one subsequent uplink signal to the network element utilizing the first uplink beam; and ignore a timer, applied upon reception of the first beam ID, for the at least one subsequent uplink signal.

37. A non-transitory computer-readable medium having stored therein instructions executable by one or more processors of a network element to:

provide a first beam identifier (ID) identifying a first uplink beam of a plurality of uplink beams associated with a first uplink signal;

receive the first uplink signal and at least one subsequent uplink signal on the first uplink beam; and provide control information comprising scheduling information for a second uplink signal of the at least one subsequent uplink signal, the control information comprising a sounding reference signal (SRS) resource indicator (SRI) codepoint indicating to utilize a last uplink beam for the second uplink signal, the last uplink beam being the first uplink beam.

38. A non-transitory computer-readable medium having stored therein instructions executable by one or more processors of a user equipment (UE) to:

receive a first beam identifier (ID) from a network element, the first beam ID identifying a first uplink beam of a plurality of uplink beams associated with transmission of a first uplink signal;

transmit the first uplink signal to the network element on the first uplink beam;

transmit at least one subsequent uplink signal to the network element utilizing the first uplink beam; and receive control information comprising scheduling information for a second uplink signal of the at least one subsequent uplink signal, the control information comprising a sounding reference signal (SRS) resource indicator (SRI) codepoint indicating to utilize a last uplink beam for the second uplink signal, the last uplink beam being the first uplink beam.

\* \* \* \* \*